(12) United States Patent
Shinotou

(10) Patent No.: US 8,775,680 B2
(45) Date of Patent: Jul. 8, 2014

(54) IMAGE DISPLAY AND IMAGE DISPLAY SYSTEM

(75) Inventor: Hidenari Shinotou, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 815 days.

(21) Appl. No.: 12/909,288

(22) Filed: Oct. 21, 2010

(65) Prior Publication Data

US 2011/0095966 A1   Apr. 28, 2011

(30) Foreign Application Priority Data

Oct. 22, 2009   (JP) ................................ 2009-243688

(51) Int. Cl.
*G06F 15/16*   (2006.01)

(52) U.S. Cl.
USPC ............................. 709/248; 709/217; 345/2.1

(58) Field of Classification Search
USPC ............................. 209/206, 217, 248; 345/2.1
See application file for complete search history.

(56) References Cited

U.S. PATENT DOCUMENTS

| | | | |
|---|---|---|---|
| 7,663,569 B2 * | 2/2010 | Ono | 345/2.3 |
| 7,743,022 B2 | 6/2010 | Kaasten et al. | |
| 2002/0126150 A1 | 9/2002 | Parry | |
| 2006/0148446 A1 * | 7/2006 | Karlsson | 455/406 |
| 2008/0018741 A1 * | 1/2008 | Stork et al. | 348/207.1 |
| 2008/0106621 A1 | 5/2008 | Jung et al. | |
| 2009/0141186 A1 * | 6/2009 | Guo et al. | 348/739 |

FOREIGN PATENT DOCUMENTS

| | | |
|---|---|---|
| JP | 2003-143053 A | 5/2003 |
| JP | 2003-169734 A | 6/2003 |
| JP | 2003-242409 A | 8/2003 |
| JP | 2004-265418 A | 9/2004 |
| JP | 2007-72714 A | 3/2007 |

OTHER PUBLICATIONS

The Extended European Search Report dated Dec. 22, 2010 (Seven (7) pages).

* cited by examiner

*Primary Examiner* — David Lazaro
*Assistant Examiner* — Marie Georges Henry
(74) *Attorney, Agent, or Firm* — Crowell & Moring LLP

(57) ABSTRACT

This image display includes a communication portion for transmitting/receiving image data to/from a remote image display including a first display portion for displaying image data as a first display image. The image display further includes a second display portion for displaying image data as a second display image and a control portion so formed as to be capable of synchronizing the first display image and the second display image with each other.

9 Claims, 17 Drawing Sheets

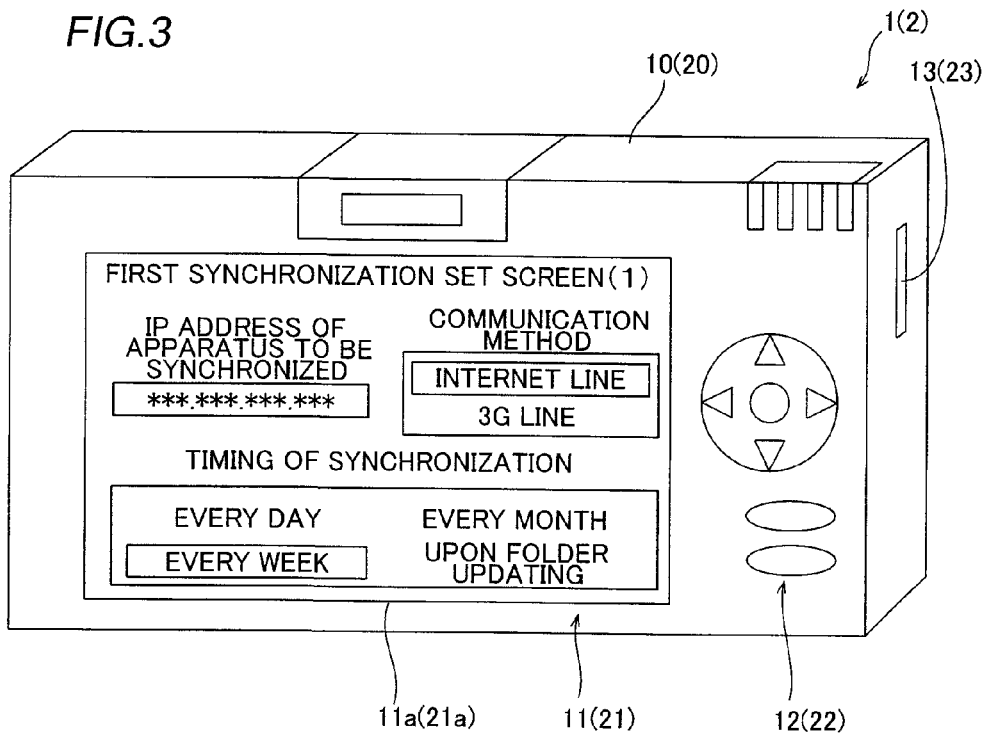
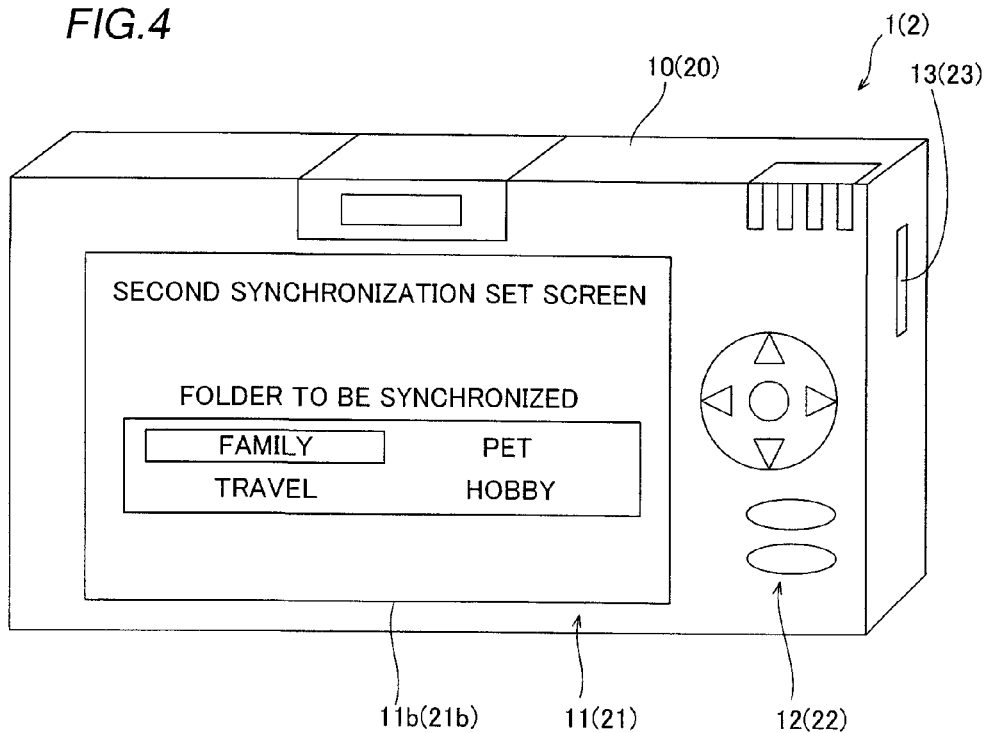

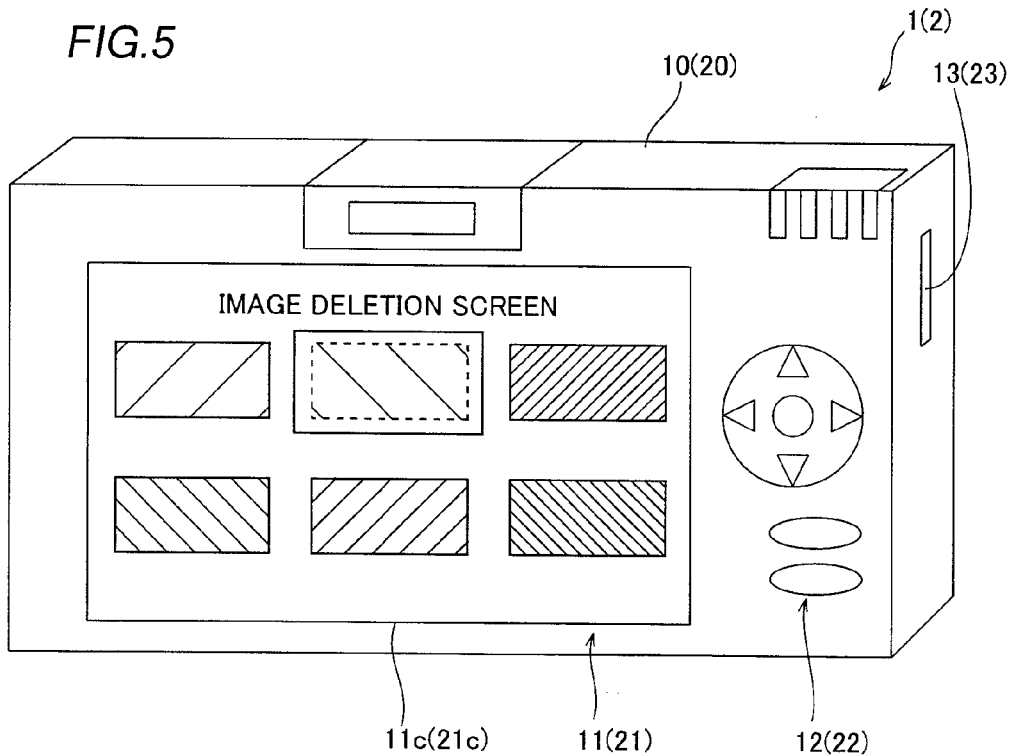

FIG.7

FILE CONTROL LIST OF REMOTE DIGITAL
PHOTO FRAME (BEFORE SYNCHRONIZATION)

| FILE NAME | CREATION DATE | DELETION |
|---|---|---|
| FILE1 | 2009/01/01/00:01 | |
| FILE2 | 2009/01/15/10:10 | DELETED |
| FILE3 | 2009/01/15/10:15 | |
| FILE4 | 2009/01/15/19:17 | |
| FILE5 | 2009/05/05/12:43 | |
| FILE6B | 2009/08/15/11:57 | |
| FILE7B | 2009/08/15/20:44 | |

FIG.8

FILE CONTROL LIST OF HOME DIGITAL
PHOTO FRAME (AFTER SYNCHRONIZATION)

| FILE NAME | CREATION DATE | DELETION |
|---|---|---|
| FILE1 | 2009/01/01/00:01 | |
| FILE2 | 2009/01/15/10:10 | DELETED |
| FILE3 | 2009/01/15/10:15 | DELETED |
| FILE4 | 2009/01/15/19:17 | |
| FILE5 | 2009/05/05/12:43 | |
| FILE6 | 2009/08/08/15:33 | |
| FILE7 | 2009/08/08/17:16 | |
| FILE8 | 2009/08/15/11:57 | |
| FILE9 | 2009/08/15/20:44 | |

FIG.9

FILE CONTROL LIST OF REMOTE DIGITAL
PHOTO FRAME (AFTER SYNCHRONIZATION)

| FILE NAME | CREATION DATE | DELETION |
|---|---|---|
| FILE1 | 2009/01/01/00:01 | |
| FILE2 | 2009/01/15/10:10 | DELETED |
| FILE3 | 2009/01/15/10:15 | DELETED |
| FILE4 | 2009/01/15/19:17 | |
| FILE5 | 2009/05/05/12:43 | |
| FILE6 | 2009/08/08/15:33 | |
| FILE7 | 2009/08/08/17:16 | |
| FILE8 | 2009/08/15/11:57 | |
| FILE9 | 2009/08/15/20:44 | |

FIG.15

FILE CONTROL LIST OF HOME DIGITAL PHOTO FRAME (BEFORE SYNCHRONIZATION)

| FILE NAME | CREATION DATE | DELETION | UNDELETION | PROTECTION |
|---|---|---|---|---|
| FILE1 | 2009/01/01/00:01 | | | PROTECTED |
| FILE2 | 2009/01/15/10:10 | | | |
| FILE3 | 2009/01/15/10:15 | DELETED | UNDELETED | |
| FILE4 | 2009/01/15/19:17 | DELETED | UNDELETED | |
| FILE5 | 2009/05/05/12:43 | | | |
| FILE6A | 2009/08/08/15:33 | | | |
| FILE7A | 2009/08/08/17:16 | | | |

FIG.16

FILE CONTROL LIST OF PORTABLE TELEPHONE (BEFORE SYNCHRONIZATION)

| FILE NAME | CREATION DATE | DELETION | UNDELETION | PROTECTION |
|---|---|---|---|---|
| FILE1 | 2009/01/01/00:01 | DELETED | | |
| FILE2 | 2009/01/15/10:10 | DELETED | | |
| FILE3 | 2009/01/15/10:15 | | | |
| FILE4 | 2009/01/15/19:17 | DELETED | | |
| FILE5 | 2009/05/05/12:43 | | | PROTECTED |
| FILE6B | 2009/08/15/11:57 | | | |
| FILE7B | 2009/08/15/20:44 | | | |

FIG. 17

FILE CONTROL LIST OF HOME DIGITAL PHOTO FRAME (AFTER SYNCHRONIZATION)

| FILE NAME | CREATION DATE | DELETION | UNDELETION | PROTECTION |
|---|---|---|---|---|
| FILE1 | 2009/01/01/00:01 | | | PROTECTED |
| FILE2 | 2009/01/15/10:10 | DELETED | | |
| FILE3 | 2009/01/15/10:15 | | | |
| FILE4 | 2009/01/15/19:17 | | | |
| FILE5 | 2009/05/05/12:43 | | | |
| FILE6 | 2009/08/08/15:33 | | | |
| FILE7 | 2009/08/08/17:16 | | | |
| FILE8 | 2009/08/15/11:57 | | | |
| FILE9 | 2009/08/15/20:44 | | | |

FIG. 18

FILE CONTROL LIST OF PORTABLE TELEPHONE (AFTER SYNCHRONIZATION)

| FILE NAME | CREATION DATE | DELETION | UNDELETION | PROTECTION |
|---|---|---|---|---|
| FILE1 | 2009/01/01/00:01 | DELETED | | |
| FILE2 | 2009/01/15/10:10 | DELETED | | |
| FILE3 | 2009/01/15/10:15 | | | |
| FILE4 | 2009/01/15/19:17 | | | |
| FILE5 | 2009/05/05/12:43 | | | PROTECTED |
| FILE6 | 2009/08/08/15:33 | | | |
| FILE7 | 2009/08/08/17:16 | | | |
| FILE8 | 2009/08/15/11:57 | | | |
| FILE9 | 2009/08/15/20:44 | | | |

FIG.19
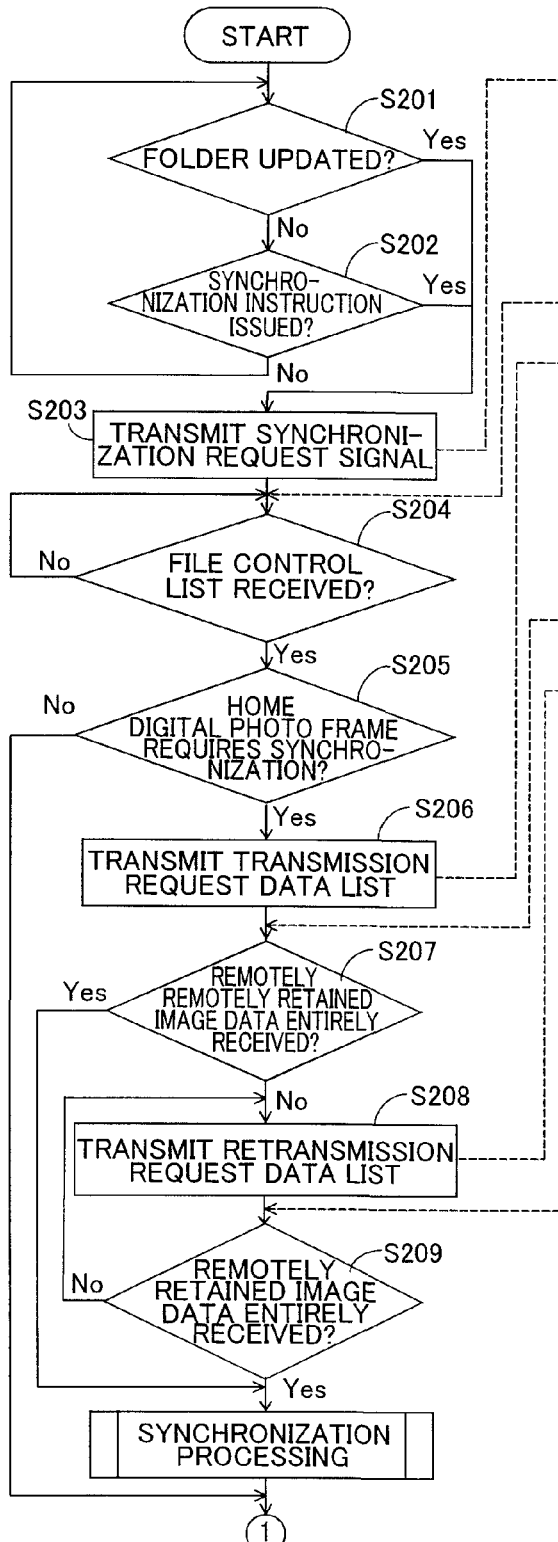
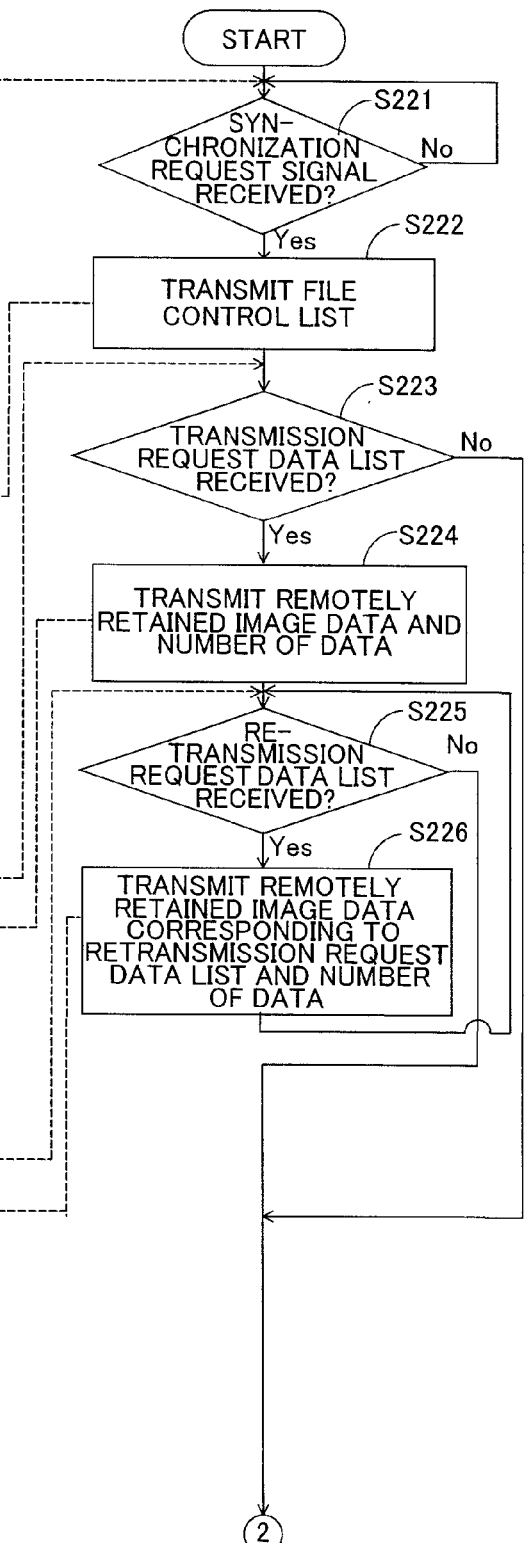

IMAGE DISPLAY AND IMAGE DISPLAY SYSTEM

BACKGROUND OF THE INVENTION

1. Field of the Invention

The present invention relates to an image display and an image display system, and more particularly, it relates to an image display and an image display system each including a communication portion for transmitting/receiving image data.

2. Description of the Background Art

An image display and an image display system each including a communication portion for transmitting/receiving image data are known in general, as disclosed in Japanese Patent Laying-Open Nos. 2003-169734, 2007-72714 and 2003-242409, for example.

The aforementioned Japanese Patent Laying-Open No. 2003-169734 discloses a digital photo frame (image display), connected to a server storing photographic data through the Internet, including a flash memory storing photographic data. The digital photo frame described in the aforementioned Japanese Patent Laying-Open No. 2003-169734 is so formed that the user thereof can store (download) photographic data selected by him/her from among those stored in the server in the flash memory of the digital photo frame and can delete the photographic data selected by him/her from the server in a state accessing the server. Further, the digital photo frame described in the aforementioned Japanese Patent Laying-Open No. 2003-169734 is so formed that the user can store (upload) photographic data selected by him/her from among those stored in the flash memory of the digital photo frame in the server.

The aforementioned Japanese Patent Laying-Open No. 2007-72714 discloses an image distribution system connecting a communication terminal operated by an originator, a photo frame having a RAM storing image data and a display monitor capable of displaying image data and an image distribution server with each other through a network. The image distribution server described in the aforementioned Japanese Patent Laying-Open No. 2007-72714 has a customer information table associating the electronic mail addresses of the communication terminal and the photo frame with each other. Thus, the image distribution system is so formed that, when the originator sends an electronic mail accompanied by image data to the image distribution server by operating the communication terminal, the image distribution server refers to the customer information table and acquires the electronic mail address of the photo frame corresponding to the communication terminal. The image distribution server is so formed as to send an electronic mail accompanied by the image data to the photo frame corresponding to the acquired electronic mail address. The image distribution system is so formed that the display monitor of the photo frame receiving the electronic mail consequently displays the image data desired by the originator operating the communication terminal as images.

The aforementioned Japanese Patent Laying-Open No. 2003-242409 discloses an image display system connecting a personal computer (PC) operated by the user thereof, a server storing image data and an image display, including a RAM storing image data, capable of displaying image data with each other through the Internet. The image display system described in the aforementioned Japanese Patent Laying-Open No. 2003-242409 is so formed that, when the user of the PC transmits image data to the server through the Internet by operating the PC, the server temporarily stores the image data. Further, the image display system is so formed that, when the image display is connected to the server through the Internet, the server transmits the image data received from the PC to the image display, so that the image display finally displays the image data transmitted from the PC as images.

In the digital photo frame disclosed in the aforementioned Japanese Patent Laying-Open No. 2003-169734, however, the user must select the photographic data to be operated and perform a prescribed operation every time he/she updates data by downloading, deleting or updating photographic data with respect to the server. Therefore, the user of the digital photo frame is disadvantageously burdened with the prescribed operation for updating data.

In the image distribution system described in the aforementioned Japanese Patent Laying-Open No. 2007-72714, the user must select image data to be operated and transmit an electronic mail accompanied by the image data from the communication terminal to the image distribution server every time he/she wishes to display a new image on the photo frame (wishes to update data). Therefore, the user is disadvantageously burdened with a complicated operation for updating data. In the image distribution system described in the aforementioned Japanese Patent Laying-Open No. 2007-72714, further, the communication terminal cannot display image data stored in the RAM of the photo frame, although the photo frame can display image data received from the communication terminal. When another image data is added to the photo frame by a means other than the electronic mail sent from the image distribution server, therefore, the communication terminal cannot display the image data added to the photo frame.

In the image display system described in the aforementioned Japanese Patent Laying-Open No. 2003-242409, the user must select image data to be operated and transmit the same from the PC to the server when he/she wishes to display a new image on the image display (wishes to update data). Therefore, the user is disadvantageously burdened with a complicated operation for updating data. In the image display system described in the aforementioned Japanese Patent Laying-Open No. 2003-242409, further, the server cannot display image data stored in the RAM of the image display, although the image display can display image data received from the PC. When another image data is added to the image display by a means other than transmission from the server, therefore, the server cannot display the image data added to the image display.

SUMMARY OF THE INVENTION

The present invention has been proposed in order to solve the aforementioned problems, and an object of the present invention is to provide an image display and an image display system each capable of suppressing a burden applied to the user of the image display when he/she updates data and capable of, when image data is added to a remote image display, displaying a display image corresponding to the added image data on the image display.

An image display according to a first aspect of the present invention includes a communication portion for transmitting/receiving image data to/from a remote image display including a first display portion for displaying image data as a first display image, a second display portion for displaying image data as a second display image and a control portion so formed as to be capable of synchronizing the first display image and the second display image with each other by transmitting first image data not displayed on the first display portion but displayed on the second display portion to the remote image display while receiving second image data not displayed on the second display portion but displayed on the first display portion from the remote image display and displaying the second image data on the second display portion when communicating with the remote image display.

As hereinabove described, the image display according to the first aspect of the present invention is provided with the control portion so formed as to be capable of synchronizing the first display image and the second display image with each other by transmitting the first image data to the remote image display while receiving the second image data from the remote image display and displaying the same on the second display portion, whereby the first display image having been displayed only on the remote image display can be displayed also on the second display portion of the image display and the second display image having been displayed only on the image display can be displayed also on the first display portion of the remote image display by synchronizing the first display image and the second display image with each other. When the remote image display adds new image data (second image data) to the image data constituting the first display image, therefore, the image display can display the first display image corresponding to the added image data. When the image display adds new image data (first image data) to the image data constituting the second display image, further, the remote image display can display the second display image corresponding to the added image data. The control portion automatically synchronizes the first display image and the second display image with each other, whereby the user of the image display may not sequentially select image data to be operated when the remote image display adds the new data (second image data) and the image display adds the new image data (first image data) (in data updating). Thus, the user of the image display can be prevented from a burden in operation when updating data.

In the aforementioned image display according to the first aspect, the communication portion is preferably so formed as to directly communicate with the remote image display. According to this structure, there is no need for a server apparatus or the like for temporarily storing image data.

In this case, the communication portion is preferably so formed as to communicate with the remote image display by a peer-to-peer system for directly communicating with the remote image display in peer relation. According to this structure, the image display can directly communicate with the remote image display by directly specifying the remote image display dissimilarly to a client-server system in which a server and clients are in master-slave relation and the clients do not directly communicate with each other, whereby the image display can communicate with the remote image display even if the server gets unoperable (broken down) due to a failure or transmission of data in excess of the quantity processable by the server. Thus, the image display can more reliably communicate with the remote image display.

The aforementioned image display according to the first aspect preferably further includes a storage portion storing image data of the second display image, while the storage portion preferably further stores second image data specification information for specifying the image data of the second display image in association with the image data of the second display image, and the control portion is preferably so formed as to recognize the first image data and the second image data to be synchronized with each other by receiving first image data specification information for specifying image data of the first display image from the remote image display and comparing the first image data specification information and the second image data specification information with each other before synchronizing the first display image and the second display image with each other. According to this structure, the control portion can recognize the first image data and the second image data to be synchronized with each other before synchronizing the first display image and the second display image with each other, whereby the image display and the remote image display can transmit/receive only the image data (first and second image data) to be synchronized with each other. Consequently, the quantity of image data transferred between the image display and the remote image display can be reduced.

In this case, the second image data specification information preferably includes a file name corresponding to the image data of the second display image and date information as to the date on which the image data of the second display image has been created, and the storage portion preferably stores the file name and the date information in a list form. According to this structure, the control portion can easily recognize the first image data and the second image data to be synchronized with each other on the basis of the file name stored in the list form and the date information before synchronizing the first display image and the second display image with each other.

In the aforementioned image display having the storage portion storing the second image data specification information, the storage portion preferably further stores a thumbnail associated with the image data of the second display image and the second image data specification information for selectably displaying the image data of the second display image on the second display portion. According to this structure, the control portion can make the user easily operate the image data of the second display image stored in the storage portion with the thumbnail and can store information related to the operation of the user on the thumbnail in the storage portion as the second image data specification information.

The aforementioned image display according to the first aspect preferably further includes a storage portion storing image data of the second display image, and the control portion is preferably so formed, when the storage portion stores the image data of the second display image corresponding to image data of the first display image having been deleted in the remote image display, as to delete the image data of the second display image corresponding to the deleted image data of the first display image from the storage portion. According to this structure, the control portion can automatically delete the image data of the second display image corresponding to the image data of the first display image having been deleted in the remote image display from the storage portion, whereby the user can be prevented from a burden in operation when deleting unnecessary image data of the second display image.

In this case, the control portion is preferably so formed, when the storage portion stores the image data of the second display image corresponding to the image data of the first display image having been deleted in the remote image display while the image data of the second display image corresponding to the deleted image data of the first display image is set to protection, as not to delete the image data of the second display image corresponding to the deleted image data of the first display image from the storage portion. According to this structure, the control portion can be prevented from automatically deleting the image data, set to protection, of the second display image as a result of the deletion of the image data in the remote image display by setting the image data of the second display image necessary for the user to protection.

The aforementioned image display according to the first aspect preferably further includes a storage portion storing image data of the second display image and is so formed as to be capable of previously setting the image data of the second display image to be synchronized with the remote image display, while the storage portion preferably stores the image data of the second display image to be synchronized with the remote image display and the image data of the second display image not to be synchronized with the remote image display in a distinguished state. According to this structure, the control portion can be prevented from synchronizing image data, wished by the user not to be synchronized with the remote image display, of the second display image with the remote image display by previously setting the image data of the second display image to be synchronized with the remote image display.

In the aforementioned image display according to the first aspect, the control portion is preferably so formed, if the control portion cannot receive the second image data from the remote image display when synchronizing the first display image and the second display image with each other, as to post the unreceived second image data to the remote image display and as to re-receive the unreceived second image data from the remote image display. According to this structure, the control portion can more reliably synchronize the first display image and the second display image with each other by re-receiving the second image data from the remote image display when the second image data has not been successfully received due to an unstable communication state between the image display and the remote image display.

In this case, the control portion is preferably so formed, if the control portion cannot receive the second image data from the remote image display, as to re-receive the unreceived second image data from the remote image display and as not to receive already received second image data from the remote image display by transmitting retransmission request information for specifying the unreceived second image data to the remote image display. According to this structure, the control portion can make the remote image display transmit only the unreceived second image data by transmitting the retransmission request information to the remote image display while distinguishing the unreceived second image data and the already received image data from each other. Thus, the quantity of image data transferred from the remote image display can be more reduced.

In the aforementioned image display according to the first aspect, the control portion is preferably so formed as to synchronize the first display image and the second display image with each other by communicating with the remote image display in response to an operation of updating image data by adding or deleting displayable image data to or from the second display portion. According to this structure, the control portion can synchronize the first display image and the second display image with each other every time the image data is updated, thereby regularly keeping the first display image and the second display image in synchronization with each other.

In the aforementioned image display according to the first aspect, the control portion is preferably so formed as to synchronize the first display image and the second display image with each other by communicating with the remote image display at a prescribed time interval. According to this structure, increase in the communication frequency between the image display and the remote image display can be suppressed in a case where the image data is frequently updated, as compared with a case of synchronizing the first display image and the second display image with each other every time the image data is updated.

In the aforementioned image display according to the first aspect, the control portion is preferably so formed as to synchronize the first display image and the second display image with each other by communicating with the remote image display on the basis of a synchronization instruction issued by a user's operation. According to this structure, the control portion can synchronize the first display image and the second display image with each other whenever the user desires.

The aforementioned image display according to the first aspect is preferably provided with a plurality of communication portions, while the plurality of communication portions are preferably so formed as to be capable of communicating with the remote image display through different communication systems respectively, so that a user selects any one of the plurality of communication portions. According to this structure, the user can select the most suitable one from the plurality of communication portions having different communication systems for making the image display transmit/receive image data.

An image display system according to a second aspect of the present invention includes a first image display including a first communication portion for transmitting/receiving image data, a first display portion for displaying image data as a first display image and a first control portion and a second image display including a second communication portion for transmitting/receiving image data to/from the first communication portion of the first image display, a second display portion for displaying image data as a second display image and a second control portion, the second control portion of the second image display is so formed as to transmit first image data not displayed on the first display portion but displayed on the second display portion to the first communication portion of the first image display while receiving second image data not displayed on the second display portion but displayed on the first display portion from the first communication portion of the first image display and displaying the second image data on the second display portion when communicating with the first image display, and the first control portion of the first image display is so formed as to transmit the second image data to the second communication portion of the second image display while receiving the first image data from the second communication portion of the second image display and displaying the first image data on the first display portion when communicating with the second image display, so that the first control portion and the second control portion can synchronize the display image and the second display image with each other.

In the image display system according to the second aspect of the present invention, as hereinabove described, the first control portion is so formed as to transmit the second image data to the second communication portion of the second image display while receiving the first image data from the second communication portion of the second image display and displaying the same on the first display portion in communication between the first image display and the second image display. Further, the second control portion is so formed as to transmit the first image data to the first communication portion of the first image display while receiving the second image data from the first communication portion of the first image display and displaying the same on the second display portion in communication between the first image display and the second image display. Therefore, the first display image having been displayed only on the first image display can be displayed also on the second display portion of the second image display, and the second display image having been displayed only on the second image display can be displayed also on the first display portion of the first image display. When the first image display adds new data (second image data) to the image data constituting the first display image, therefore, the second image display can display the first display image corresponding to the added image data. When the second image display adds new image data (first image data) to the image data constituting the second display image, further, the first image display can display the second display image corresponding to the added image data.

In the image display system according to the second aspect, further, the first control portion and the second control portion are so formed as to be capable of synchronizing the first display image and the second display image with each other as hereinabove described so that the first control portion and the second control portion automatically synchronize the first display image and the second display image with each other, whereby the users of the first and second image displays may not sequentially select image data to be operated when the first and second image displays add the new image data (first and second image data) respectively. Thus, the users of the first and second image displays can be prevented from burdens in operation when updating data.

In the aforementioned image display system according to the second aspect, the first image display is preferably either an electronic photo frame or a portable telephone, and the second image display is preferably also either an electronic photo frame or a portable telephone. According to this structure, the second image display can display the first display image corresponding to the added image data and the first image display can display the second display image corresponding to the added image data in the image display system including the electronic photo frame(s) and/or the portable telephone(s). Further, the users of the first and second image displays can be prevented from burdens in operation when updating data.

In the aforementioned image display system according to the second aspect, the first communication portion and the second communication portion are preferably so formed as to directly communicate with each other. According to this structure, there is no need for a server apparatus or the like for temporarily storing image data.

In this case, the first communication portion and the second communication portion are preferably so formed as to communicate with each other by a peer-to-peer system for directly communicating with each other in peer relation. According to this structure, the first and second image displays can directly communicate with each other by specifying each other dissimilarly to a client-server system in which a server and clients are in master-slave relation and the clients do not directly communicate with each other, whereby the first and second image displays can communicate with each other even if the server gets unoperable (broken down) due to a failure or transmission of data in excess of the quantity processable by the server. Thus, the first and second image displays can more reliably communicate with each other.

In the aforementioned image display system according to the second aspect, the first image display preferably further includes a first storage portion storing image data of the first display image and first image data specification information for specifying the image data of the first display image in association with each other, the second image display preferably further includes a second storage portion storing image data of the second display image and second image data specification information for specifying the image data of the second display image in association with each other, the first control portion is preferably so formed as to transmit the first image data specification information for specifying the image data of the first display image to the second image display before synchronizing the first display image and the second display image with each other, and the second control portion is preferably so formed as to recognize the first image data and the second image data to be synchronized with each other by receiving the first image data specification information from the first image display and comparing the first image data specification information and the second image data specification information with each other. According to this structure, the second control portion can recognize the first image data and the second image data to be synchronized with each other before synchronizing the first display image and the second display image with each other, whereby the first image display and the second image display can transmit/receive only the image data (first and second image data) to be synchronized with each other. Consequently, the quantity of image data transferred between the first image display and the second image display can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates a first set screen of a digital photo frame in the image display system according to the first embodiment of the present invention;

FIG. 4 illustrates a second set screen of the digital photo frame in the image display system according to the first embodiment of the present invention;

FIG. 5 is an image deletion screen of a home digital photo frame in the image display system according to the first embodiment of the present invention;

FIG. 6 is a table showing a file control list of the home digital photo frame before synchronization in the image display system according to the first embodiment of the present invention;

FIG. 7 is a table showing a file control list of a remote digital photo frame before synchronization in the image display system according to the first embodiment of the present invention;

FIG. 8 is a table showing the file control list of the home digital photo frame after synchronization in the image display system according to the first embodiment of the present invention;

FIG. 9 is a table showing the file control list of the remote digital photo frame after synchronization in the image display system according to the first embodiment of the present invention;

FIG. 15 is a table showing a file control list of the home digital photo frame before synchronization in the image display system according to the second embodiment of the present invention;

FIG. 16 is a table showing a file control list of a portable telephone before synchronization in the image display system according to the second embodiment of the present invention;

FIG. 17 is a table showing the file control list of the home digital photo frame after synchronization in the image display system according to the second embodiment of the present invention;

FIG. 18 is a table showing the file control list of the portable telephone after synchronization in the image display system according to the second embodiment of the present invention;

FIG. 19 is a flow chart showing control flows in the home digital photo frame and the portable telephone in synchronization in the image display system according to the second embodiment of the present invention;

DESCRIPTION OF THE PREFERRED EMBODIMENTS

Embodiments of the present invention are now described with reference to the drawings.

First Embodiment

First, the structure of an image display system 100 according to a first embodiment of the present invention is described with reference to FIGS. 1 and 2.

Figure 1:
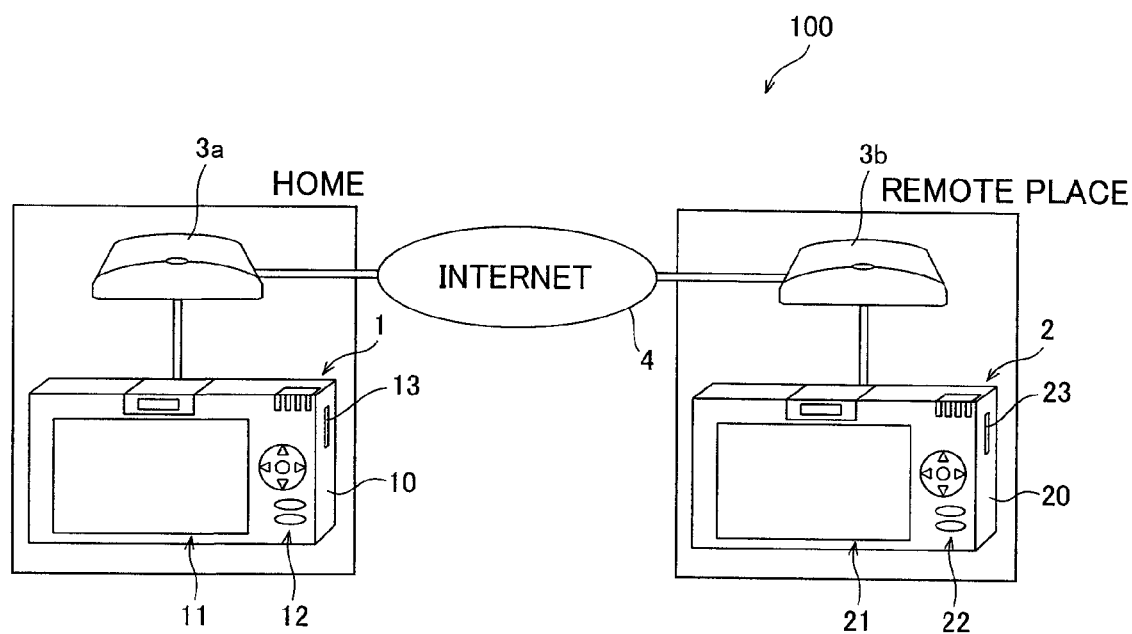
FIG. 1 is a schematic diagram showing the overall structure of an image display system according to a first embodiment of the present invention.

In the image display system 100 according to the first embodiment of the present invention, a home digital photo frame 1 arranged in the home of a user and a remote digital photo frame 2 arranged in a remote place different from the home of the user are wire-connected to the Internet 4 through routers 3a and 3b respectively, as shown in FIG. 1. Different IP (Internet Protocol) addresses are allocated to the home digital photo frame 1 and the remote digital photo frame 2 respectively. The home digital photo frame 1 is an example of the "image display", the "second image display" or the "electronic photo frame" in the present invention, and the remote digital photo frame 2 is an example of the "remote image display", the "first image display" or the "electronic photo frame" in the present invention.

The home digital photo frame 1 includes a body portion 10 having a rectangular shape in front elevational view, as shown in FIG. 1. A rectangular display portion 11 is provided on the front surface of the body portion 10. An operating portion 12 is arranged on the front surface of the body portion 10 adjacently to the display portion 11. A media card connection portion 13 is provided on a side surface of the body portion 10. As shown in FIG. 2, the body portion 10 is provided therein with a flash ROM 14, a RAM 15, a wire network communication portion 16a, a wireless network communication portion 16b, a power system portion 17, an RTC (real time clock) 18 and a control portion (CPU) 19. The flash ROM 14 is an example of the "storage portion" in the present invention, and the wire network communication portion 16a is an example of the "communication portion" or the "second communication portion" in the present invention. The control portion 19 is an example of the "second control portion" in the present invention.

The display portion 11 consists of a liquid crystal display, and is so formed as to be capable of displaying image data stored in any media card (not shown) connected to the media card connection portion 13 or the flash ROM 14 as a self-display image. The display portion 11 can display a display change screen (not shown) for changing the display mode of the self-display image or adjusting the color tone thereof. Examples of the display mode of the self-display image are a fixed display mode of displaying one self-display image, a slide show display mode of displaying a plurality of self-display images while switching the same at a prescribed time interval and a clock display mode. The display portion 11 is an example of the "second display portion" in the present invention, and the self-display image is an example of the "second display image" in the present invention.

The operating portion 12 is so provided that the user selects and decides various items on set screens, described later, or the like displayed on the display portion 11. The media card connection portion 13 is so formed as to be responsive to various media cards such as an SD (Secure Digital) Memory Card (registered trademark), an xD Picture Card (registered trade mark) and an CF (Compact Flash) Card (registered trademark). The control portion 19 is so formed as to be capable of reading image data stored in any media card through the media card connection portion 13.

According to the first embodiment, the flash ROM 14 consisting of a rewritable nonvolatile memory is provided with a plurality of folders. The plurality of folders are classified into a synchronous folder 14a storing image data to be synchronized with a remote apparatus (remote digital photo frame 2) in synchronization with the remote apparatus and an asynchronous folder 14b storing image data not to be synchronized with the remote apparatus. The specific contents of synchronization processing of the home digital photo frame 1 and the remote digital photo frame 2 are described later.

The synchronous folder 14a stores a plurality of image data to be synchronized with a synchronous folder 24a provided in a flash ROM 24, described later, of the remote digital photo frame 2, a file control list and thumbnails reduction-displaying the plurality of image data and already deleted image data respectively. The file control list of the synchronous folder 14a records information of the plurality of image data and information of image data having been deleted from the synchronous folder 14a in the past as a list of files corresponding to the image data respectively. Each file records a file name corresponding to each image data, date information as to the date on which the corresponding image file has been created and whether or not the corresponding image file has been deleted in a list form. The thumbnails are recorded in association with the plurality of image data and the files of the file control list, and so formed as to be selectably displayed on the display portion 11, as shown in FIG. 5.

The asynchronous folder 14b stores a plurality of image data not to be synchronized with the synchronous folder 24a of the remote digital photo frame 2. The flash ROM 14 is so formed, when the number of the image data stored therein is increased to exceed the quantity of data storable therein, as to erase the excessive image data, recorded in the information of the file control list of the flash ROM 14, successively from the oldest one and as to store new image data in the vacated memory region.

The flash ROM 14 can also store image data read from various media cards through the media card connection portion 13. The control portion 19 is so formed as to recognize that the synchronous folder 14a of the flash ROM 14 is updated when the synchronous folder 14a stores image data read from any media card.

The RAM 15 consists of a volatile memory, and is utilized as a working region of the control portion 19. The wire network communication 16a is provided for making wire communication. The body portion 10 can be wire-connected to the Internet 4 through the wire network communication portion 16a.

The wireless network communication portion 16b is provided for making wireless communication with a portable telephone or the like through a base station (not shown) in a third generation (3G) mobile communication system. According to the first embodiment, the body portion 10 is wire-connected to the Internet 4 through the wire network communication portion 16a, and the wireless network communication portion 16b is not in use.

The power system portion 17 has a function of supplying power to the respective portions of the body portion 10. The RTC 18 has a clock function, and is utilized by the control portion 19 for recognizing the prescribed time interval and for acquiring the current time when displaying a clock on the display portion 11.

The control portion 19 consists of a CPU, and is so formed as to control operations of the respective portions of the body portion 10 by running programs (not shown). Specific control of the control portion 19 is described later.

Figure 2:
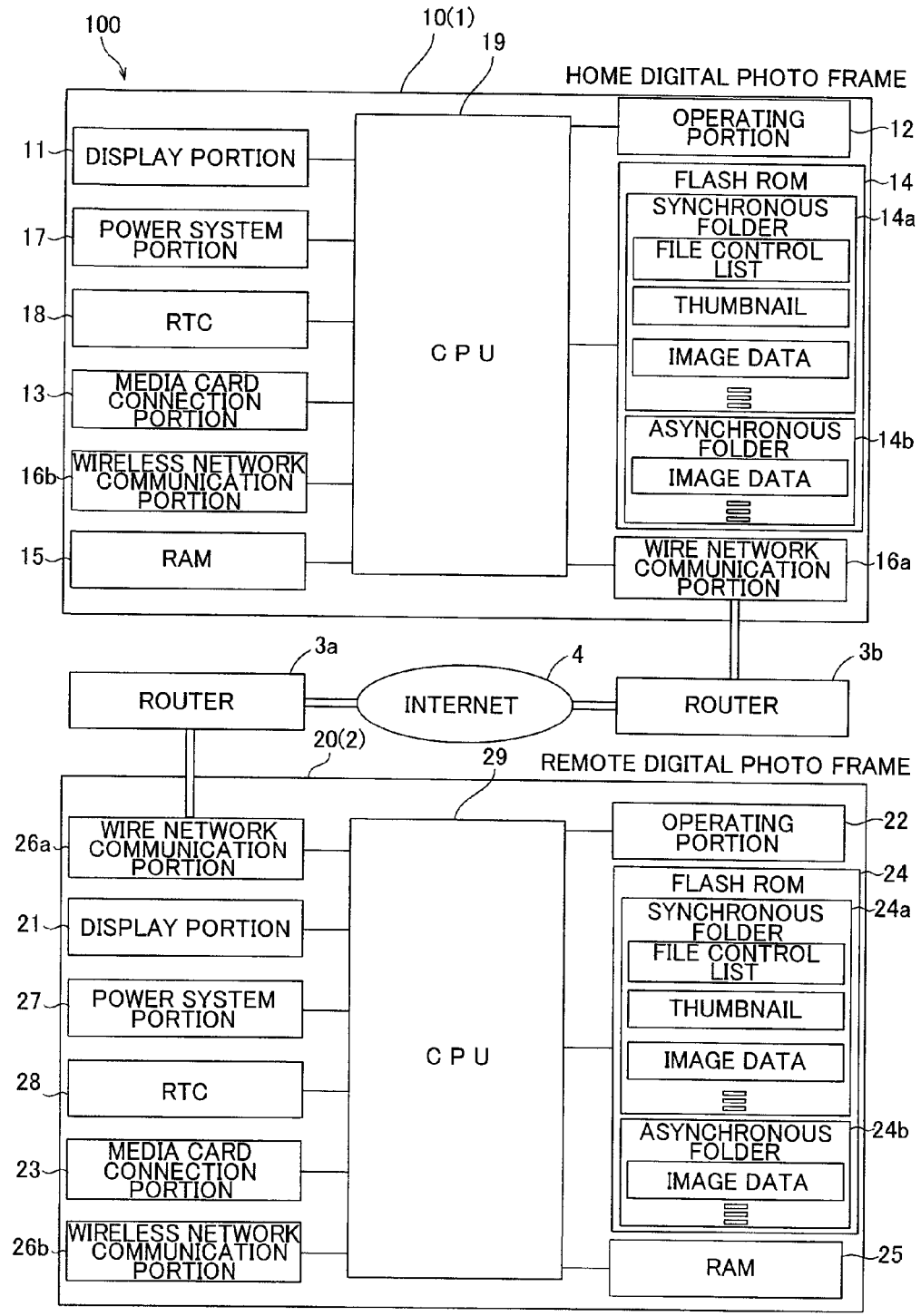
FIG. 2 is a block diagram showing the overall structure of the image display system according to the first embodiment of the present invention.

The remote digital photo frame 2 is substantially identical in structure to the home digital photo frame 1, as shown in FIGS. 1 and 2. In other words, the remote digital photo frame 2 is provided with a body portion 20, a display portion 21, an operating portion 22 and a media card connection portion 23 correspondingly to the body portion 10, the display portion 11, the operating portion 12 and the media card connection portion 13 of the aforementioned home digital photo frame 1 respectively.

As shown in FIG. 2, the body portion 20 is provided therein with the flash ROM 24 consisting of a rewritable nonvolatile memory. The body portion 20 is further provided therein with a RAM 25, a wire network communication portion 26a, a wireless network communication portion 26b, a power system portion 27, an RTC 28 and a control portion (CPU) 29 correspondingly to the RAM 15, the wire network communication portion 16a, the wireless network communication portion 16b, the power system portion 17, the RTC 18 and the control portion 19 of the aforementioned home digital photo frame 1 respectively. The wire network communication portion 26a is an example of the "first communication portion" in the present invention, and the control portion 29 is an example of the "first control portion" in the present invention.

The display portion 21 is so formed as to be capable of displaying image data stored in any media card (not shown) connected to the media card connection portion 23 or the flash ROM 24 as a remote display image. The display portion 21 is an example of the "first display portion" in the present invention, and the remote display image is an example of the "first display image" in the present invention.

According to the first embodiment, the flash ROM 24 is provided with a plurality of folders. The plurality of folders are classified into the synchronous folder 24a storing image data to be synchronized with the other apparatus (home digital photo frame 1) in synchronization with the other apparatus and an asynchronous folder 24b storing image data not to be synchronized with the other apparatus.

The synchronous folder 24a stores a plurality of image data to be synchronized with the synchronous folder 14a provided in the flash ROM 14 of the home digital photo frame 1, a file control list and thumbnails reduction-displaying images related to the plurality of image data and already deleted image data respectively. The file control list of the synchronous folder 24a records information of the plurality of image data and information of image data having been deleted from the synchronous folder 24a in the past as a list of files corresponding to the image data respectively. The asynchronous folder 24b stores a plurality of image data not to be synchronized with the synchronous folder 14a of the home digital photo frame 1. The flash ROM 24 is so formed, when the number of the image data stored therein is increased to exceed the quantity of data storable therein, as to erase the excessive data, recorded in the information of the file control list of the flash ROM 24, successively from the oldest one and as to store new image data in the vacated memory region.

The flash ROM 24 is so formed as to be capable of storing image data read from various media cards through the media card connection portion 23. The control portion 29 is so formed as to recognize that the synchronous folder 24a of the flash ROM 24 is updated when the synchronous folder 24a stores image data read from any media card.

According to the first embodiment, the home digital photo frame 1 and the remote digital photo frame 2 are so formed that the users thereof can set synchronization processing. More specifically, the home digital photo frame 1 is so formed that the control portion 19 (see FIG. 2) displays a first set screen 11a (see FIG. 3) and a second set screen 11b (see FIG. 4) on the display portion 11 of the home digital photo frame 1 as shown in FIGS. 3 and 4 when the user thereof selects corresponding items from a menu screen (not shown) or the like.

The first set screen 11a is so formed that the user can input the IP address of the remote apparatus (remote digital photo frame 2) to be synchronized, as shown in FIG. 3. Thus, the home digital photo frame 1 is so formed as to be capable of directly communicating with the remote digital photo frame 2 in peer relation by the peer-to-peer system by specifying the IP address of the remote digital photo frame 2. Further, the home digital photo frame 1 is so formed as to transmit data to the remote digital photo frame 2 in an encrypted state.

The first set screen 11a is so formed that the user can select the communication system for synchronizing the home photo frame 1 with the remote apparatus (remote digital photo frame 2) and the timing for synchronizing the home photo frame 1 with the remote apparatus. More specifically, the first set screen 11a is so formed that the user can select whether to communicate with the remote apparatus through an "Internet line" with the wire network communication portion 16a or to communicate with the remote apparatus through a "3G line" with the wireless network communication portion 16b as to the communication system. Further, the first set screen 11a is so formed that the user can select any of "every day", "every week", "every month" and "upon folder updating" as the timing for synchronization. According to the first embodiment, the user selects the "Internet line" as the communication system, while selecting "every week" as the timing for synchronization.

The second set screen 11b is so formed that the user can select the folder (synchronous folder 14a) including image data to be synchronized, as shown in FIG. 4. More specifically, the second set screen 11b is so formed that the user can select any of a "family" folder, a "travel" folder, a "pet" folder and a "hobby" folder as the folder including the image data to be synchronized. According to the first embodiment, the user selects the "family" folder as the synchronous folder 14a. On the other hand, the remaining "travel", "pet" and "hobby" folders are set to the asynchronous folder 14b.

Similarly to the home digital photo frame 1, the remote digital photo frame 2 is also so formed that the control portion 29 (see FIG. 2) displays a first set screen 21a (see FIG. 3) and a second set screen 21b (see FIG. 4) on the display portion 21 of the remote digital photo frame 2 when the user thereof selects corresponding items from a menu screen (not shown) or the like, as shown in FIGS. 3 and 4. Thus, the remote digital photo frame 2 is so formed that the user thereof can input the IP address of the other apparatus (home digital photo frame 1) to be synchronized, whereby the remote digital photo frame 2 can directly communicate with the home digital photo frame 1 in peer relation by the peer-to-peer system by specifying the IP address of the home digital photo frame 1. Further, the remote digital photo frame 2 is so formed as to transmit data to the home digital photo frame 1 in an encrypted state.

The control portions 19 and 29 of the home digital photo frame 1 and the remote digital photo frame 2 are so formed that the users of the home digital photo frame 1 and the remote digital photo frame 2 can delete image data stored in the flash ROMs 14 and 24 respectively. More specifically, the control portion 19 (29) is so formed as to display an image deletion screen 11c (21c) shown in FIG. 5 on the display portion 11 (21) when the user thereof selects a corresponding item from the menu screen (not shown) or the like. The image deletion screen 11c (21c) displays a plurality of thumbnails corresponding to the plurality of image data stored in the flash ROM 14 (24). The image deletion screen 11c (21c) displays the plurality of thumbnails in a state surrounded by solid lines before the user selects any of the thumbnails.

The image display system 100 is so formed that, when the user selects the thumbnail of image data he/she wishes to delete, the control portion 19 (29) deletes the image data corresponding to the selected thumbnail from the flash ROM 14 (24). At this time, the image deletion screen 11c (21c) displays the selected thumbnail, having been surrounded by the solid line, in a state surrounded by a broken line. The flash ROM 14 (24) is formed not to delete but to retain the thumbnail corresponding to the image data having been deleted therefrom and the files corresponding to the image data of the file control list.

According to the first embodiment, the control portion 19 of the home digital photo frame 1 is so formed as to transmit a "synchronization request signal" to the remote digital photo frame 2 in response to the timing for synchronization set by the user or a synchronization instruction issued by the user. Further, the control portion 19 is so formed as to compare the file control list of the synchronous folder 24a transmitted from the remote digital photo frame 2 in response to the "synchronization request signal" with the file control list of the synchronous folder 14a. Thus, the control portion 19 recognizes "self-retained image data" corresponding to the image data, not stored in the synchronous folder 24a, stored in the synchronous folder 14a to be displayed on the display portion 11 as the self-display image. At the same time, the control portion 11 recognizes "remotely retained image data" corresponding to the image data not stored in the synchronous folder 14a but stored in the synchronous folder 24a to be displayed on the display portion 21 as the remote display image. The "self-retained image data" is an example of the "first image data" in the present invention, and the "remotely retained image data" is an example of the "second image data" in the present invention.

According to the first embodiment, the control portion 19 of the home digital photo frame 1 is so formed as to transmit the "self-retained image data" to the remote digital photo frame 2 while receiving the "remotely retained image data" from the remote digital photo frame 2, storing the same in the synchronous folder 14a and displaying the same on the display portion 11 as the self-display image on the basis of results obtained by comparing the file control lists of the synchronous folders 14a and 24a with each other.

More specifically, the control portion 19 is so formed as to receive the "remotely retained image data" from the remote digital photo frame 2 by transmitting a "transmission request data list" (described later in more detail) including information of the recognized "remotely retained image data" to the remote digital photo frame 2. Further, the control portion 19 is so formed as to store the received "remotely retained image data" in the synchronous folder 14a and as to display the same on the display portion 11 as the self-display image.

In addition, the control portion 19 is so formed as to transmit a "remote synchronization data list" (described later in more detail) including information of the recognized "self-retained image data" and information of the image data having been deleted from the synchronous folder 14a, the "self-retained image data" and the number of the transmitted "self-retained image data" to the remote digital photo frame 2. Thus, the control portion 19 is so formed as to make the synchronous folder 24a of the remote digital photo frame 2 store the "self-retained image data" while simultaneously making the control portion 29 of the remote digital photo frame 2 delete the same image data, corresponding to the image data having been deleted from the synchronous folder 14a through the user's operation, in the synchronous folder 24a of the remote digital photo frame 2 from the synchronous folder 24a. Further, the control portion 19 is so formed as to delete the same image data, corresponding to the image data in the synchronous folder 24a of the remote digital photo frame 2 deleted by the user's operation, in the synchronous folder 14a from the synchronous folder 14a.

According to the first embodiment, the control portion 19 of the home digital photo frame 1 is so formed as to synchronize image data retained by the home digital photo frame 1 and the remote digital photo frame 2 respectively with each other through the Internet 4 due to the aforementioned control.

On the other hand, the control portion 29 of the remote digital photo frame 2 is so formed as to compare the synchronous folders 14a and 24a of the flash ROMs 14 and 24 of the home digital photo frame 1 and the remote digital photo frame 2 with each other in response to timing for synchronization set by the user or in response to a synchronization instruction issued by the user, similarly to the control portion 19 of the aforementioned home digital photo frame 1. Further, the control portion 29 is so formed as to transmit the "remotely retained image data" to the home digital photo frame 1 while receiving the "self-retained image data" from the home digital photo frame 1, storing the same in the synchronous folder 24a and displaying the same on the display portion 21 as the remote display image on the basis of results obtained by comparing the file control lists of the synchronous folders 14a and 24a with each other.

In addition, the control portion 29 of the remote digital photo frame 2 is so formed as to make the synchronous folder 14a of the home digital photo frame 1 store the "remotely retained image data" while simultaneously making the control portion 19 of the home digital photo frame 1 delete the same image data, corresponding to the image data having been deleted from the synchronous folder 24a by the user's operation, in the synchronous folder 14a of the home digital photo frame 1 from the synchronous folder 14a. Further, the control portion 29 is so formed as to delete the same image data, corresponding to the image data in the synchronous folder 14a of the home digital photo frame 1 deleted by the user's operation, in the synchronous folder 14a of the home digital photo frame 1 from the synchronous folder 24a.

According to the first embodiment, the control portion 29 of the remote digital photo frame 2 is so formed as to synchronize image data retained by the remote photo frame 2 and the home digital photo frame 1 respectively with each other through the Internet 4 due to the aforementioned control.

Exemplary synchronization processing of the home digital photo frame 1 and the remote digital photo frame 2 according to the first embodiment of the present invention is now described with reference to FIGS. 2 and 6 to 9.

Before synchronization of the home digital photo frame 1 and the remote digital photo frame 2, the file control list of the synchronous folder 14a (see FIG. 2) of the home digital photo frame 1 records files 1, 2, 3, 4, 5, 6A and 7A corresponding to image files respectively in a state arranged in a time-series manner, as shown in FIG. 6. Each of the files 1, 2, 3, 4, 5, 6A and 7A of the file control list of the synchronous folder 14a records the file name, the date on which the corresponding image file has been created and whether or not the corresponding image file has been deleted. The file 3 corresponds to image data having been deleted in the home digital photo frame 1.

Before synchronization of the home digital photo frame 1 and the remote digital photo frame 2, the file control list of the synchronous folder 24a (see FIG. 2) of the remote digital photo frame 2 records files 1, 2, 3, 4, 5, 6B and 7B corresponding to image files respectively in a state arranged in a time-series manner, as shown in FIG. 7. The files 1, 2, 3, 4 and 5 of the file control list of the synchronous folder 24a are identical to the files 1, 2, 3, 4 and 5 of the file control list of the synchronous folder 14a shown in FIG. 6 respectively, and the identical files correspond to identical image data. On the other hand, the files 6B and 7B of the file control list of the synchronous folder 24a are not identical to the files 6A and 7A of the file control list of the synchronous folder 14a shown in FIG. 6 respectively, but correspond to different image data. The file 2 corresponds to image data having been deleted in the remote digital photo frame 2.

When either the home digital photo frame 1 or the remote digital photo frame 2 receives the synchronization instruction from the user, the image data corresponding to the files 6A and 7A of the synchronous folder 14a are recognized as the "self-retained image data" (not stored in the synchronous folder 24a but stored in the synchronous folder 14a to be displayed on the display portion 11 as the self-display image). Further, the image data corresponding to the files 6B and 7B of the synchronous folder 24a are recognized as the "remotely retained image data" (not stored in the synchronous folder 14a but stored in the synchronous folder 24a to be displayed on the display portion 21 as the remote display image). Then, the home digital photo frame 1 transmits the "self-retained image data" (image data corresponding to the files 6A and 7A) of the synchronous folder 14a to the remote digital photo frame 2, while the remote digital photo frame 2 transmits the "remotely retained image data" (image data corresponding to the files 6B and 7B) of the synchronous folder 24a to the home digital photo frame 1. The image data (self-retained image data) corresponding to the files 6A and 7A are examples of the "first image data" in the present invention, and the image data (remotely retained image data) corresponding to the files 6B and 7B are examples of the "second image data" in the present invention.

The synchronous folder 24a of the remote digital photo frame 2 deletes image data corresponding to the file 3, deleted from the synchronous folder 14a of the home digital photo frame 1, while the synchronous folder 14a of the home digital photo frame 1 deletes image corresponding to the file 2, deleted from the synchronous folder 24a of the remote digital photo frame 2. Consequently, the synchronous folders 14a and 24a of the home digital photo frame 1 and the remote digital photo frame 2 are updated to states having image data identical to each other.

Thus, the file control lists of the synchronous folders 14a and 24a of the home digital photo frame 1 and the remote digital photo frame 2 are rendered identical to each other, as shown in FIGS. 8 and 9. More specifically, the files in the file control lists are so arranged in a time-series manner that the files 6A and 7A (see FIG. 6) created on the earlier date become files 6 and 7 in the corresponding file control list after synchronization while the files 6B and 7B (see FIG. 7) created on the later date become files 8 and 9 in the corresponding file control list after synchronization. The files 2 and 3 correspond to the deleted image data.

Control flows in the home digital photo frame 1 and the remote digital photo frame 2 according to the first embodiment in synchronization are now described with reference to FIGS. 2, 6, 7 and 10. According to the first embodiment, the home digital photo frame 1 performs synchronization processing with respect to the remote digital photo frame 2.

Figure 10:
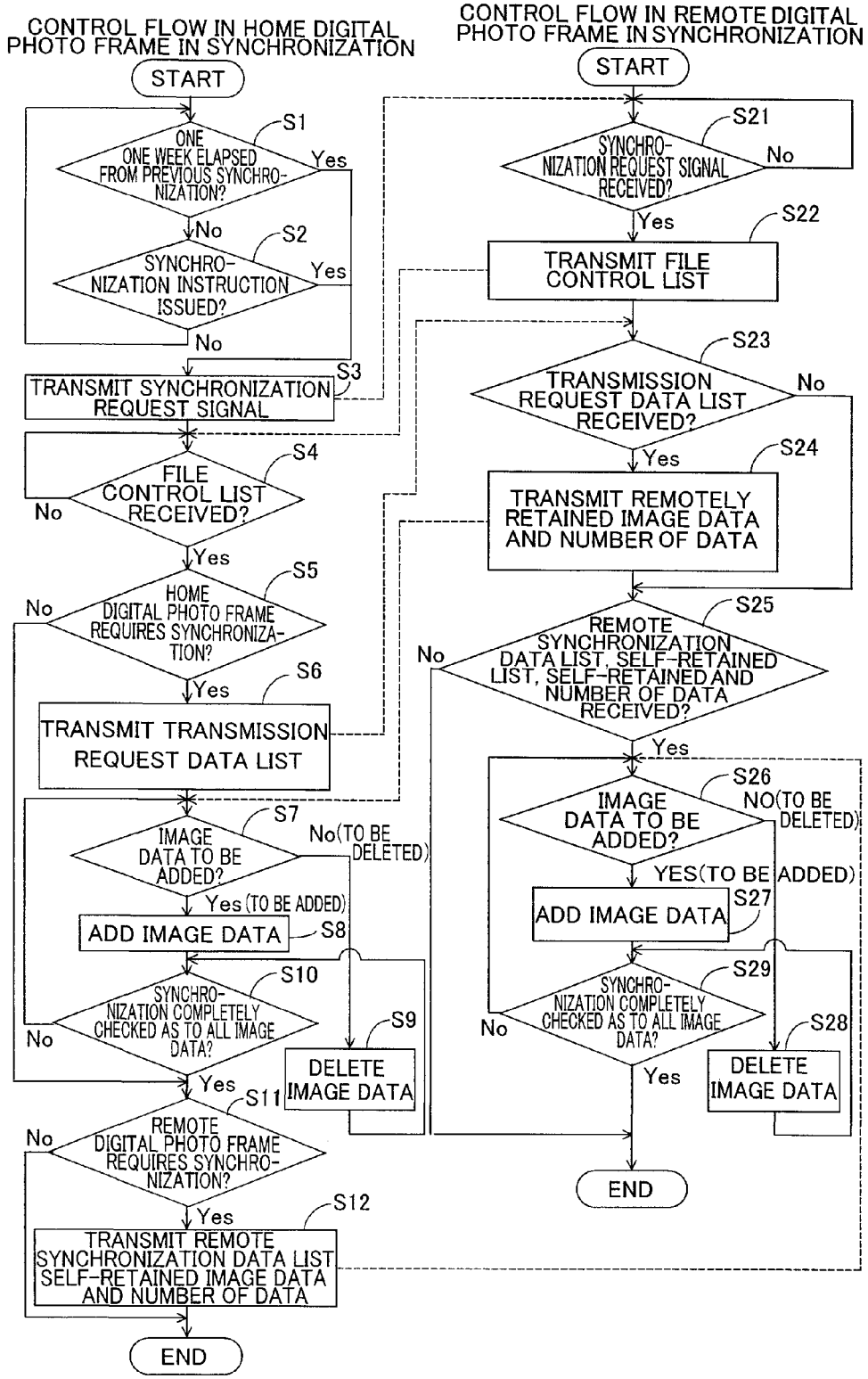
FIG. 10 is a flow chart showing control flows in the home digital photo frame and the remote digital photo frame in synchronization in the image display system according to the first embodiment of the present invention.

As shown in FIG. 10, the control portion 19 (see FIG. 2) of the home digital photo frame 1 first determines whether or not the prescribed time interval (set to one week, for example, according to the first embodiment) has elapsed from previous synchronization at a step S1 on the basis of the timing for synchronization previously set by the user. At this time, the control portion 19 determines the elapse of time with the RTC 1. If determining that the prescribed time interval has elapsed from the previous synchronization at the step S1, the control portion 19 advances to a step S3 for synchronizing the home digital photo frame 1 with the remote digital photo frame 2. If determining that the prescribed time interval has not yet elapsed from the previous synchronization at the step S1, on the other hand, the control portion 19 determines whether or not the user has issued the synchronization instruction at a step S2. If determining that the user has issued the synchronization instruction at the step S2, the control portion 19 advances to the step S3. If determining that the user has not issued the synchronization instruction at the step S2, on the other hand, the control portion 19 returns to the step S1.

At the step S3, the control portion 19 transmits the "synchronization request signal" to the remote digital photo frame 2. Then, the control portion 19 advances to a step S4.

On the other hand, the control portion 29 (see FIG. 2) of the remote digital photo frame 2 determines whether or not the "synchronization request signal" has been received from the home digital photo frame 1 at a step S21. The control portion 29 repeats this determination until the same determines that the "synchronization request signal" has been received. If determining that the "synchronization request signal" has been received at the step S21, the control portion 29 recognizes the synchronous folder 24a (see FIG. 2) to be synchronized with the home digital photo frame 1 and transmits the file control list of the synchronous folder 24a to the home digital photo frame 1 at a step S22. Then, the control portion 29 advances to a step S23.

At the step S4, the control portion 19 of the home digital photo frame 1 determines whether or not the file control list (see FIG. 7) of the synchronous folder 24a has been received from the remote digital photo frame 2. The control portion 29 repeats this determination until the same determines that the file control list of the synchronous folder 24a has been received. If determining that the file control list of the synchronous folder 24a has been received at the step S4, the control portion 19 advances to a step S5.

At the step S5, the control portion 19 compares the received file control list of the synchronous folder 24a with the file control list (see FIG. 6) of the synchronous folder 14a (see FIG. 2). Then, the control portion 19 determines whether or not there are the "remotely retained image data" not stored in the synchronous folder 14a but stored in the synchronous folder 24a to be displayed on the display portion 21 (see FIG. 2) as the remote display image. In other words, the control portion 19 determines whether or not the home digital photo frame 1 requires synchronization with the remote digital photo frame 2. If determining that the home digital photo frame 1 requires synchronization with the remote digital photo frame 2 at the step S5, the control portion 19 transmits the "transmission request data list" including the information of the recognized "remotely retained image data" (image data corresponding to the files 6B and 7B shown in FIG. 7) to the remote digital photo frame 2 at a step S6. Then, the control portion 19 advances to a step S7. If determining that the home digital photo frame 1 does not require synchronization with the remote digital photo frame 2 at the step S5, on the other hand, the control portion 19 advances to a step S11.

On the other hand, the control portion 29 of the remote digital photo frame 2 determines whether or not the "transmission request data list" has been received from the home digital photo frame 1 at a step S23. If determining that the "transmission request data list" has been received at the step S23, the control portion 29 transmits the "remotely retained image data" (image data corresponding to the files 6B and 7B) and the number (two) of the transmitted "remotely retained image data" to the home digital photo frame 1. Then, the control portion 29 advances to a step S25. If determining that the "transmission request data list" has not been received at the step S23, on the other hand, the control portion 29 advances to the step S25.

At the step S7, the control portion 19 of the home digital photo frame 1 determines whether the image data to be synchronized are the "remotely retained image data" received from the remote digital photo frame 2 to be added to the synchronous folder 14a or the image data, corresponding to the image data having been deleted from the synchronous folder 24a of the remote digital photo frame 2, to be deleted from the synchronous folder 14a. If determining that the image data are those (image data corresponding to the files 6B and 7B) to be added to the synchronous folder 14a at the step S7, the control portion 19 newly adds the image data (image data corresponding to the files 6B and 7B) to the synchronous folder 14a at a step S8. Then, the control portion 19 advances to a step S10.

If determining that the image data is that (image data corresponding to the file 2 shown in FIG. 7) to be deleted from the synchronous folder 14a at the step S7, on the other hand, the control portion 19 deletes the image data (image data corresponding to the file 2) from the synchronous folder 14a at a step S9. Then, the control portion 19 advances to the step S10.

At the step S10, the control portion 19 determines whether or not synchronization has been completely checked as to all image data in the synchronous folder 14a. If determining that synchronization has been completely checked as to all image data at the step S10, the control portion 19 advances to the step S11. The control portion 19 terminates the synchronization processing in the home digital photo frame 1 by determining that synchronization has been completely checked as to all image data at the step S10. If determining that synchronization has not yet been completely checked as to all image data at the step S10, on the other hand, the control portion 19 returns to the step S7.

At the step S11, the control portion 19 compares the received file control list (see FIG. 7) of the synchronous folder 24a with the file control list (see FIG. 6) of the synchronous folder 14a. Then, the control portion 19 determines whether or not there are the "self-retained image data" not stored in the synchronous folder 24a but stored in the synchronous folder 14a and displayed on the display portion 11 (see FIG. 2) as the self-display image. In other words, the control portion 19 determines whether or not the remote digital photo frame 2 requires synchronization with the home digital photo frame 1.

If determining that the remote digital photo frame 2 requires synchronization with the home digital photo frame 1 at the step S11, the control portion 19 transmits the "remote synchronization data list" including information of the recognized "self-retained image data" (image data corresponding to the files 6A and 7A shown in FIG. 6) and information of image data (image data corresponding to the file 3 shown in FIG. 6) deleted from the synchronous folder 14a, the "self-retained image data" corresponding to the "remote synchronization data list" and the number (two) of the transmitted "self-retained image data" to the remote digital photo frame 2. Then, the control portion 19 of the home digital photo frame 1 terminates the control. Also when determining that the remote digital photo frame 2 does not require synchronization with the home digital photo frame 1 at the step S11, the control portion 19 of the home digital photo frame 1 terminates the control.

On the other hand, the control portion 29 of the remote digital photo frame 2 determines whether or not the "remote synchronization data list", the "self-retained image data" (image data corresponding to the files 6A and 7A) and the number (two) of the "self-retained image data" have been received from the home digital photo frame 1 at the step S25. If determining that the "remote synchronization data list", the "self-retained image data" and the number of the "self-retained image data" have been received at the step S25, the control portion 29 advances to a step S26. If determining that the "remote synchronization data list", the "self-retained image data" and the number of the "self-retained image data" have not been received at the step S25, on the other hand, the remote digital photo frame 2 does not require synchronization, and hence the control portion 29 of the remote digital photo frame 2 terminates.

At the step S26, the control portion 29 of the remote digital photo frame 2 determines whether the image data to be synchronized are the "self-retained image data" received from the home digital photo frame 1 to be added to the synchronous folder 24a or that corresponding to the image data, having been deleted from the synchronous folder 14a of the home digital photo frame 1, to be deleted from the synchronous folder 24a. If determining that the image data are those (image data corresponding to the files 6A and 7A) to be added to the synchronous folder 24a at the step S26, the control portion 29 newly adds the image data (image data corresponding to the files 6A and 7A) to the synchronous folder 24a at a step S27. Then, the control portion 29 advances to a step S29. If determining that the image data is that (image data corresponding to the file 3) to be deleted from the synchronous folder 24a at the step S26, on the other hand, the control portion 29 deletes the image data (image data corresponding to the file 3) from the synchronous folder 24a at a step S28. Then, the control portion 29 advances to the step S29.

At the step S29, the control portion 29 determines whether or not synchronization has been completely checked as to all image data in the synchronous folder 24a. If determining that synchronization has been completely checked as to all image data at the step S29, the control portion 29 of the remote digital photo frame 2 terminates the control by terminating the synchronization processing. If determining that synchronization has not yet been completely checked as to all image data at the step S29, on the other hand, the control portion 29 returns to the step S26.

According to the first embodiment, as hereinabove described, the home digital photo frame 1 is provided with the control portion 19 transmitting the "self-retained image data" to the remote digital photo frame 2 while receiving the "remotely retained image data" from the remote digital photo frame 2, storing the same in the synchronous folder 14a and displaying the same on the display portion 11 as the self-display image, whereby the control portion 19 can make the display portion 21 of the remote digital photo frame 2 also display the self-display image, having been displayed only on the home digital photo frame 1, as the remote display image and make the display portion 11 of the home digital photo frame 1 also display the remote display image, having been displayed only on the remote digital photo frame 2, as the self-display image by synchronizing the self-display image and the remote display image with each other. Thus, the home digital photo frame 1 can display the remote display image corresponding to the added "remotely retained image data" when the remote digital photo frame 2 adds the "remotely retained image data", and the remote digital photo frame 2 can display the self-display image corresponding to the added "self-retained image data" when the home digital photo frame 1 adds the "self-retained image data". Further, the control portion 19 automatically synchronizes the self-display image and the remote display image with each other, whereby the user of the home digital photo frame 1 may not sequentially select image data to be operated for updating data every time the control portion 19 receives the "remotely retained image data" from the remote digital photo frame 2 and transmits the "self-retained image data" to the remote digital photo frame 2. Thus, the user of the home digital photo frame 1 can be prevented from a burden in operation for updating data.

According to the first embodiment, as hereinabove described, the home digital photo frame 1 is so formed as to be capable of directly communicating with the remote digital photo frame 2 in peer relation by the peer-to-peer system by specifying the IP address of the remote digital photo frame 2 so that the same can directly communicate with the remote digital photo frame 2 while directly specifying the remote digital photo frame 2 dissimilarly to a client-server system in which a server and clients are in master-slave relation and the clients do not directly communicate with each other, whereby the home digital photo frame 1 can communicate with the remote digital photo frame 2 even if the server gets unoperable (broken down) due to a failure or transmission of data in excess of the quantity processable by the server. Thus, the home digital photo frame 1 can more reliably communicate with the remote digital photo frame 2. Further, there is no need for a server apparatus or the like for temporarily storing image data.

According to the first embodiment, as hereinabove described, the control portion 19 is so formed as to recognize the "self-retained image data" and the "remotely retained image data" by comparing the file control list of the synchronous folder 24a transmitted from the remote digital photo frame 2 in response to the "synchronization request signal" with the file control list of the synchronous folder 14a so that the same can recognize the "self-retained image data" and the "remotely retained image data" to be synchronized with each other before synchronizing the self-display image and the remote display image with each other, whereby the home digital photo frame 1 and the remote digital photo frame 2 can transmit/receive only image data (self-retained image data and remotely retained image data) to be synchronized with each other when synchronizing the self-retained image and the remote display image with each other. Consequently, the quantity of image data transferred between the home digital photo frame 1 and the remote digital photo frame 2 can be reduced.

According to the first embodiment, as hereinabove described, each file control list records the file name corresponding to each image data and the date information of the date on which the corresponding image file has been created in the list form, whereby the control portion 19 can easily recognize the "self-retained image data" and the "remotely retained image data" to be synchronized with each other on the basis of the file name and the date information stored in the list form before synchronizing the self-display image and the remote display image with each other.

According to the first embodiment, as hereinabove described, the home digital photo frame 1 is so formed that the flash ROM 14 records the thumbnails in the state associated with the plurality of image data and the files of the file control list and the display portion 11 selectably displays the same, whereby the control portion 19 can make the user easily operate the image data of the self-display image stored in the flash ROM 14 with any of the thumbnails and can make the flash ROM 14 store information related to the operation of the user of the home digital photo frame 1 on the corresponding one of the thumbnails as information as to whether or not any image file has been deleted from the file control list or the like.

According to the first embodiment, as hereinabove described, the control portion 19 is so formed as to delete the same data, corresponding to the image data having been deleted from the synchronous folder 24a of the remote digital photo frame 2 through the user's operation, from the synchronous folder 14a so that the same can automatically delete the image data in the synchronous folder 14a, corresponding to the image data having deleted from the synchronous folder 24a of the remote digital photo frame 2, from the flash ROM 14, whereby the user can be prevented from a burden in operation when the control portion 19 deletes unnecessary image data from the synchronous folder 14a.

According to the first embodiment, as hereinabove described, the plurality of folders of the flash ROM 14 are classified into the synchronous folder 14a storing the image data to be synchronized with the remote apparatus (remote digital photo frame 2) in synchronization with the remote apparatus and the asynchronous folder 14b storing image data not to be synchronized with the remote apparatus, whereby the control portion 19 can be prevented from synchronizing image data of the self-display image, wished by the user not to be synchronized, with the remote digital photo frame 2 by previously setting the image data of the self-display image to be synchronized with the remote digital photo frame 2.

According to the first embodiment, as hereinabove described, the control portion 19 is so formed as to synchronize the home digital photo frame 1 and the remote digital photo frame 2 with each other at the prescribed time interval (one week), whereby increase in the communication frequency between the home digital photo frame 1 and the remote digital photo frame 2 can be suppressed in a case where the image data are frequently updated, as compared with a case of synchronizing the self-display image and the remote display image with each other every time the image data are updated.

According to the first embodiment, as hereinabove described, the control portion 19 is so formed as to synchronize the home digital photo frame 1 and the remote digital photo frame 2 with each other in response to the synchronization instruction issued by the user, whereby the same can synchronize the self-display image and the remote display image with each other whenever the user desires.

According to the first embodiment, as hereinabove described, the home digital photo frame 1 is provided with the wire network communication portion 16a for making wire communication and the wireless network communication portion 16b for making wireless communication through the third generation mobile communication system as communication portions and so formed that the user can select whether to communicate with the remote digital photo frame 2 through the "Internet line" with the wire network communication portion 16a or to communicate with the remote digital photo frame 2 through the "3G line" with the wireless network communication portion 16b, whereby the user can set the home digital photo frame 1 to transmit/receive image data by selecting the more suitable communication portion from the wire network communication portion 16a and the wireless network communication portion 16b having different communication systems.

Second Embodiment

An image display system 200 according to a second embodiment of the present invention is now described with reference to FIGS. 2, 3 and 11 to 21. In the image display system 200 according to the second embodiment, a home digital photo frame 201 and a portable telephone 205 synchronize image data with each other through wireless communication, dissimilarly to the aforementioned first embodiment.

Figure 11:
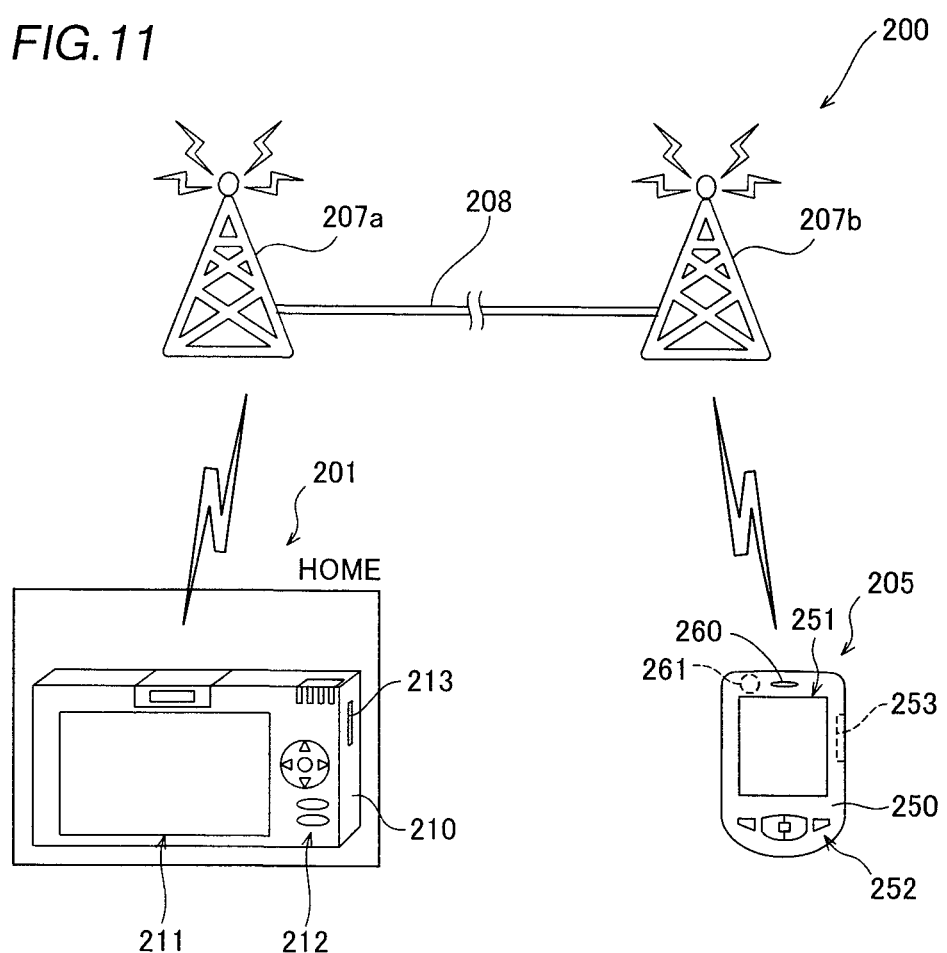
FIG. 11 is a schematic diagram showing the overall structure of an image display system according to a second embodiment of the present invention.

In the image display system 200 according to the second embodiment of the present invention, the home digital photo frame 201 is wireless-connected to a base station 207a while the portable telephone 205 is wireless-connected to another base station 207b, as shown in FIG. 11. The base stations 207a and 207b are connected with each other through a telephone line network 208. Thus, the home digital photo frame 201 and the portable telephone 205 are wireless-connected with each other through the base stations 207a and 207b. Different mail addresses are allocated to the home digital photo frame 201 and the portable telephone 205 respectively. The home digital photo frame 201 is an example of the "image display", the "second image display" or the "electronic photo frame" in the present invention, and the portable telephone 205 is an example of the "remote image display" or the "first image display" in the present invention.

Figure 12:
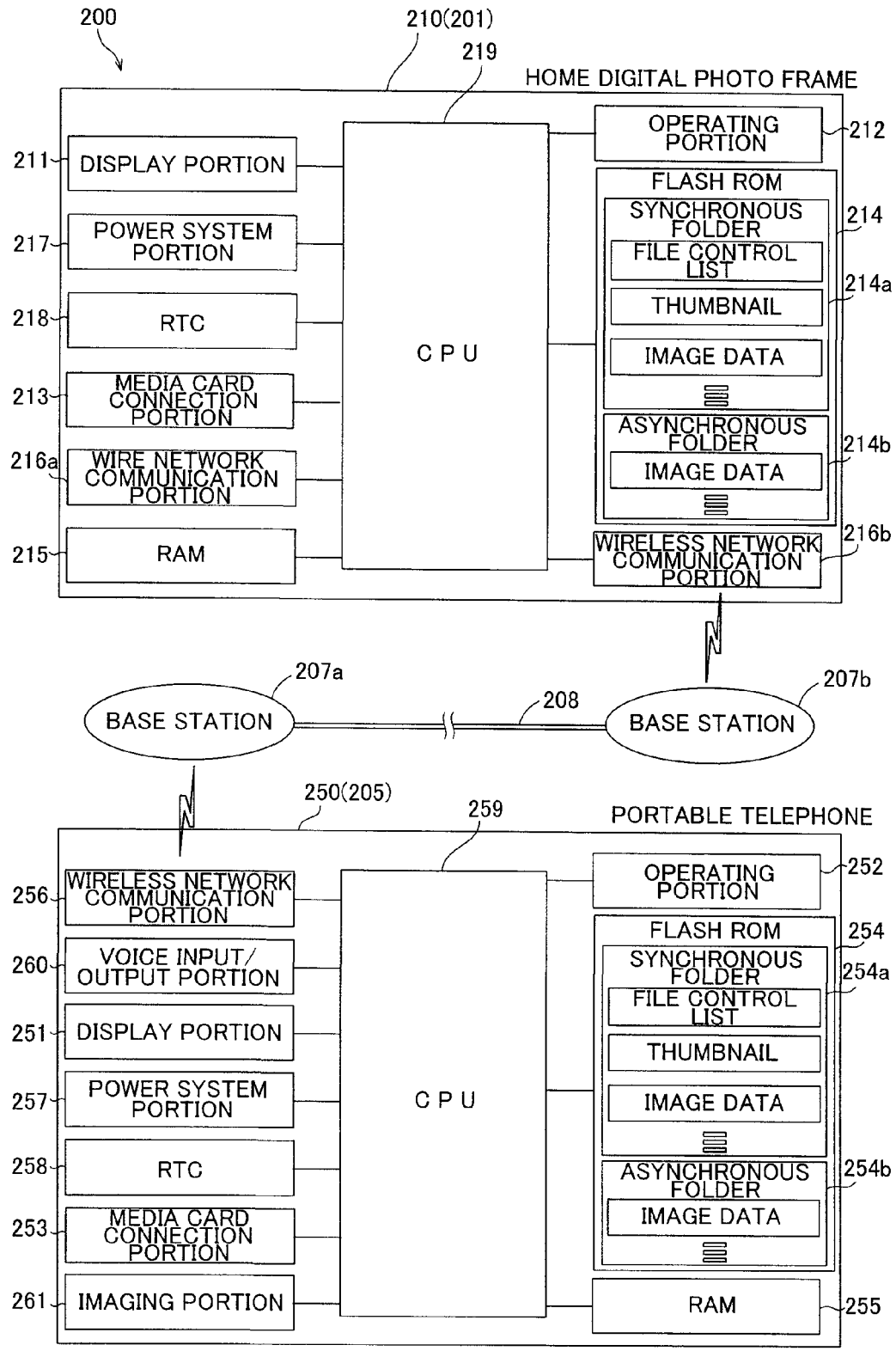
FIG. 12 is a block diagram showing the overall structure of the image display system according to the second embodiment of the present invention.

The home digital photo frame 201 is substantially similar in structure to the home digital photo frame 1 (see FIG. 2) according to the aforementioned first embodiment. The home digital photo frame 201 is wireless-connected to the base station 207b by the wireless network communication portion 216b through a 3G line, as shown in FIG. 12. The user of the home digital photo frame 201 selects "upon folder updating" (see FIG. 3) as timing for synchronization with the remote apparatus (portable telephone 205) to be synchronized with the home digital photo frame 201. The term "upon folder updating" denotes a point of time when a synchronous folder 214a of a flash ROM 214 stores image data read from any of various media cards. The wireless network communication portion 216b is an example of the "communication portion" or the "second communication portion" in the present invention.

The home digital photo frame 201 is so formed that the user inputs the mail address of the remote apparatus (portable telephone 205) to be synchronized therewith when setting synchronization processing. Thus, the home digital photo frame 201 is so formed as to directly communicate with the portable telephone 205 in peer relation by a peer-to-peer system by specifying the mail address of the portable telephone 205. Further, the home digital photo frame 201 is so formed as to transmit data such as image data to the portable telephone 205 in an encrypted state by attaching the same to an electronic mail.

The portable telephone 205 includes a body portion 250 having a substantially rectangular shape in front elevational view, as shown in FIG. 11. A display portion 251 is provided on the front surface of the body portion 250. An operating portion 252 is arranged on a lower portion of the front surface of the body portion 250.

As shown in FIG. 12, the body portion 250 is provided therein with a media card connection portion 253, a flash ROM 254, a RAM 255, a wireless network communication portion 256, a power system portion 257, an RTC 258 and a control portion 259.

As shown in FIG. 11, a voice input/output portion 260 is arranged on an upper portion of the front surface of the body portion 250. An imaging portion 261 is arranged on an upper portion of the back surface of the body portion 250.

As shown in FIG. 12, the display portion 251, the operating portion 252 and the media card connection portion 253 of the portable telephone 205 have functions substantially similar to those of the display portion 21, the operating portion 22 and the media card connection portion 23 (see FIG. 2) of the remote digital photo frame 2 in the aforementioned first embodiment respectively. Further, the RAM 255, the wireless network communication portion 256, the power system portion 257, the RTC 258 and the control portion 259 provided in the body portion 250 also have functions substantially similar to those of the RAM 25, the wireless network communication portion 26b, the power system portion 27, the RTC 28 and the control portion 29 (see FIG. 2) of the remote digital photo frame 2 in the aforementioned first embodiment respectively.

The flash ROM 254 consisting of a rewritable nonvolatile memory is provided with a plurality of folders. The plurality of folders are classified into a synchronous folder 254a storing image data to be synchronized with the other apparatus (home digital photo frame 201) in synchronization with the other apparatus and an asynchronous folder 254b storing image data not to be synchronized with the other apparatus.

Figure 13:
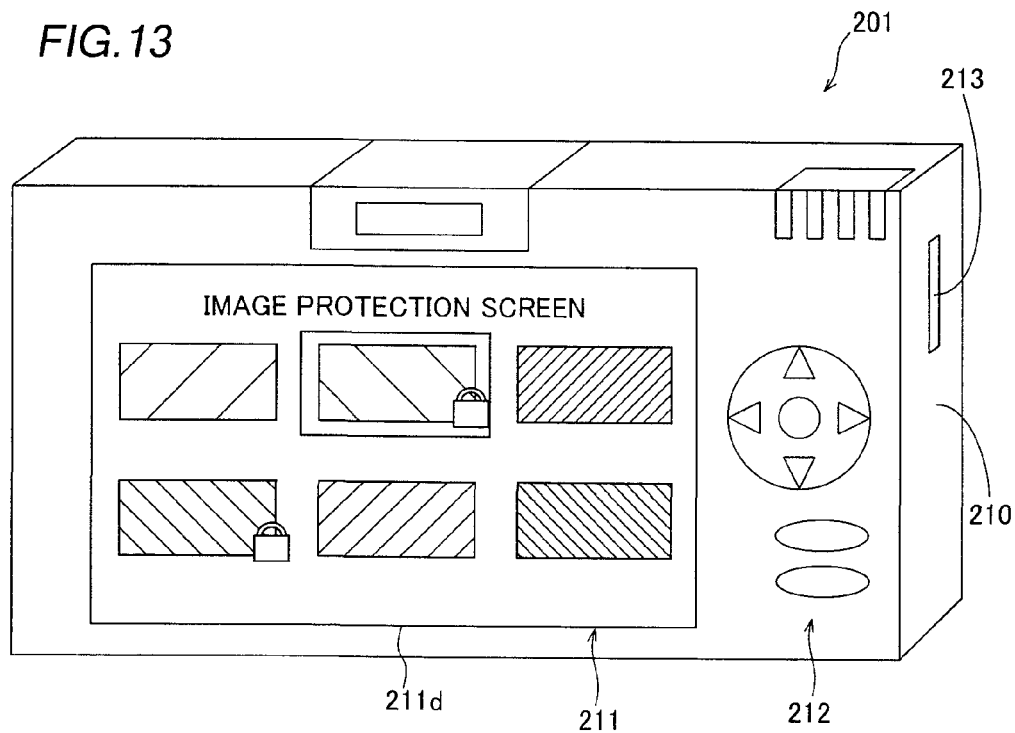
FIG. 13 illustrates an image protection screen of a home digital photo frame in the image display system according to the second embodiment of the present invention.
Figure 14:
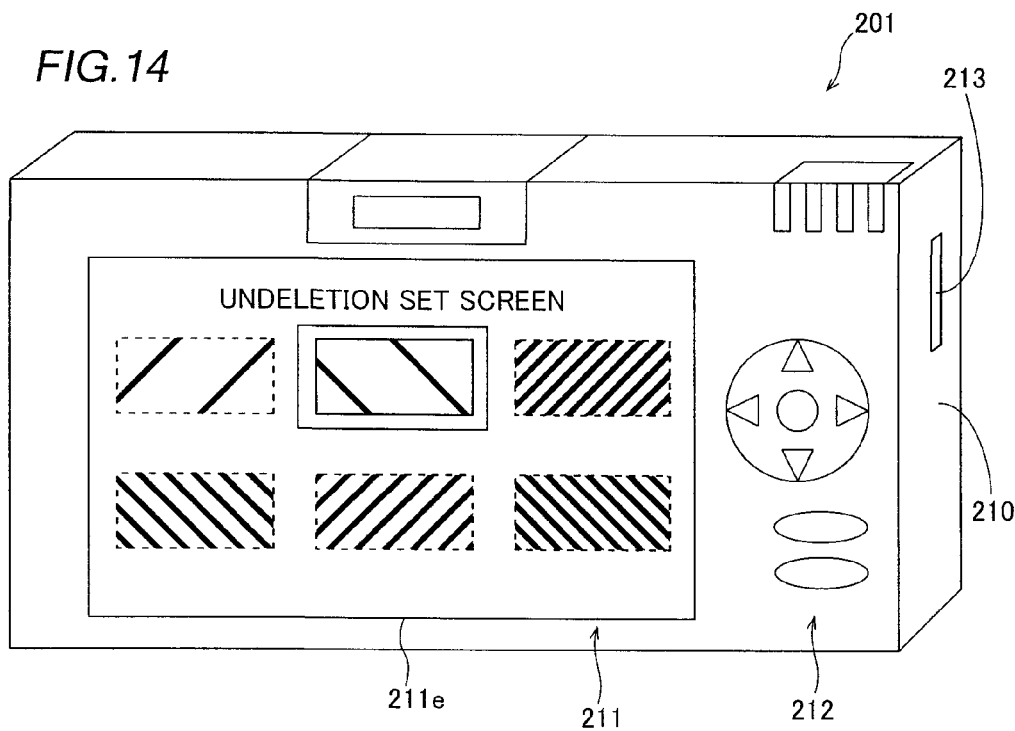
FIG. 14 illustrates an undeletion set screen of the home digital photo frame in the image display system according to the second embodiment of the present invention.

The synchronous folder 254a stores a plurality of image data to be synchronized with the synchronous folder 214a provided in the flash ROM 214 of the home digital photo frame 201, a file control list and thumbnails reduction-displaying the plurality of image data and already deleted image data respectively. The file control list of the synchronous folder 254a records information of the plurality of image data and information of image data having been deleted from the synchronous folder 254a in the past as a list of files corresponding to the image data respectively. Each file records, in addition to a file name corresponding to each image data, date information as to the date on which the corresponding image file has been created and whether or not the corresponding image file has been deleted, the presence or absence of undeletion setting and the presence or absence of protection setting in a list form. The thumbnails are recorded in association with the plurality of image data and the files of the file control list, and so formed as to be selectably displayed on the display portion 211, as shown in FIGS. 13 and 14. The protection setting and the undeletion setting are described later in more detail. The asynchronous folder 254b stores a plurality of image data not to be synchronized with the synchronous folder 214a of the home digital photo frame 201.

The flash ROM 254 is so formed as to be capable of storing image data read from various media cards through the media card connection portion 253. The control portion 259 is so formed as to recognize that the synchronous folder 254a of the flash ROM 254 is updated when the synchronous folder 254a stores image data read from any media card and image data acquired by the imaging portion 261.

The wireless network communication portion 256 is provided for making wireless communication with the home digital photo frame 201 through the base stations 207a and 207b with the 3G line. The voice input/output portion 260 has a function of outputting a voice received by the wireless network communication portion 256 when making a phone call to another portable telephone (not shown) or the like and a function of incorporating a voice in the phone call. The imaging portion 261 consists of a camera or the like, and is so formed as to be capable of acquiring an image of a landscape or the like and converting the image to digitalized image data. The wireless network communication portion 256 is an example of the "first communication portion" in the present invention.

The portable telephone 205 is so set that the user thereof can set synchronization processing. Further, the portable telephone 205 is so set that the user inputs the mail address of the other apparatus (home digital photo frame 201) to be synchronized therewith at this time for setting the synchronization processing. Thus, the portable telephone 205 is so formed as to directly communicate with the home digital photo frame 201 in peer relation by a peer-to-peer system by specifying the mail address of the home digital photo frame 201. In addition, the portable telephone 205 is so formed as to transmit data such as image data to the home digital photo frame 201 in an encrypted state by attaching the same to an electronic mail.

The portable telephone 205 is so formed that the user thereof can select timing for synchronization with the other apparatus to be synchronized therewith and a folder (synchronous folder 254a) including image data to be synchronized. In the portable telephone 205, the user selects "upon folder updating" as the timing for synchronization with the other apparatus (home digital photo frame 201) to be synchronized therewith. The term "upon folder updating" denotes a point of time when the synchronous folder 254a of the flash ROM 254 stores image data read from any of various media cards and image data acquired by the imaging portion 261.

A control portion 219 of the home digital photo frame 201 and the control portion 259 of the portable telephone 205 are so formed that the users thereof can delete any image data stored in the flash ROMs 214 and 254 by their operations respectively.

Further, the control portions 219 and 259 of the home digital photo frame 201 and the portable telephone 205 are so formed as to be capable of retaining (protection-setting) image data selected by the users from among the image data stored in the flash ROMs 214 and 254 without deleting the same by synchronization. More specifically, the control portion 219 (see FIG. 12) is so formed as to display an image protection screen 211d on the display portion 211 when the user selects a corresponding item from a menu screen (not shown) or the like, as shown in FIG. 13. The image protection screen 211d displays thumbnails of the plurality of image data stored in the flash ROM 214 (see FIG. 12). The home digital photo frame 201 is so formed that, when the user of the home digital photo frame 201 selects the thumbnails of image data he/she wishes to protect, the selected image data are set to protection and the control portion 219 retains the image data without deleting the same from the flash ROM 214 by synchronization. At this time, the display portion 211 displays lock marks indicating that the images are protected on lower right portions of the selected thumbnails. The portable telephone 205 is also so formed as to retain image data selected by the user to be set to protection without deleting the same from the flash ROM 254 by synchronization through a structure substantially similar to the above.

As shown in FIG. 12, the flash ROMs 214 and 254 are so formed, when the numbers of the image data stored therein are increased to exceed the quantities of data storable therein, as to erase the excessive data, recorded in the information of the file control lists of the flash ROMs 214 and 254 and not set to protection, successively from the oldest ones and as to store new image data in the vacated memory regions.

The control portion 259 of the portable telephone 205 is so formed as to compare the synchronous folders 214a and 254a of the flash ROMs 214 and 254 of the home digital photo frame 201 and the portable telephone 205 with each other in response to the timing for synchronization set by the user or a synchronization instruction issued by the user, similarly to the control portion 19 (see FIG. 2) of the home digital photo frame 1 according to the aforementioned first embodiment. Further, the control portion 259 is so formed as to transmit "remotely retained image data" to the home digital photo frame 201 while receiving "self-retained image data" from the home digital photo frame 201, storing the same in the synchronous folder 254a and displaying the same on the display portion 251 as a remote display image on the basis of results obtained by comparing the file control lists of the synchronous folders 214a and 254a with each other.

In addition, the control portion 259 of the portable telephone 205 is so formed as to make the synchronous folder 214a of the home digital photo frame 201 store the "remotely retained image data" while making the control portion 219 of the home digital photo frame 201 delete the same image data, corresponding to image data having been deleted from the synchronous folder 254a through the user's operation, from the synchronous folder 214a of the home digital photo frame 201. Further, the control portion 259 is so formed as to delete the same image data, corresponding to image data having been deleted from the synchronous folder 214a of the home digital photo frame 201 through the user's operation, from the synchronous folder 254a.

According to the second embodiment, the control portion 259 of the portable telephone 205 is so formed as to synchronize image data retained by the portable telephone 205 and image data retained by the home digital photo frame 201 with each other through the base stations 207a and 207b due to the aforementioned control. The control portion 219 of the home digital photo frame 201 is also so formed as to synchronize image data retained by the home digital photo frame 201 and image data retained by the portable telephone 205 with each other through the base stations 207a and 207b by performing control similar to that of the control portion 19 (see FIG. 2) of the home digital photo frame 1 according to the aforementioned first embodiment.

Further, the control portion 219 of the home digital photo frame 201 is so formed, if the same cannot receive the "remotely retained image data" from the portable telephone 205, as to re-receive the unreceived "remotely retained image data" from the portable telephone 205 by creating a retransmission request data list and posting the unreceived "remotely retained image data" to the portable telephone 205. In other words, the control portion 219 is so formed as to re-receive only the unreceived "remotely retained image data" from the portable telephone 205 and as not to re-receive the already received "remotely retained image data" from the portable telephone 205. The retransmission request data list is an example of the "retransmission request information" in the present invention.

The control portion 259 of the portable telephone 205 is so formed, if the same cannot receive the "self-retained image data" from the home digital photo frame 201, as to re-receive the unreceived "self-retained image data" from the home digital photo frame 201 by creating a retransmission request data list and posting the unreceived "self-retained image data" to the home digital photo frame 201. In other words, the control portion 259 is so formed as to re-receive only the unreceived "self-retained image data" from the home digital photo frame 201 and as not to re-receive the already received "self-retained image data" from the home digital photo frame 201.

The control portion 219 of the home digital photo frame 201 is so formed as to be capable of storing image data having been temporarily deleted from the synchronous folder 214a in the synchronous folder 214a of the flash ROM 214 again and displaying the same on the display portion 211 as the self-display image by receiving the same from the portable telephone 205 when the home digital photo frame 201 is synchronized with the portable telephone 205.

More specifically, the control portion 219 (see FIG. 12) is so formed as to display an undeletion set screen 211e on the display portion 211 when the user thereof selects a corresponding item from the menu screen (not shown) or the like, as shown in FIG. 14. The undeletion set screen 211e displays thumbnails of a plurality of data having been temporarily deleted from the synchronous folder 214a (see FIG. 12). The undeletion set screen 211e displays the plurality of thumbnails corresponding to the deleted image data in a state surrounded by broken lines. The control portion 219 is so formed, when the user selects the thumbnail of any image data he/she wishes to undelete (sets the image data to undeletion), as to receive the selected image data from the image data from the potable telephone 205 and undelete the same (store the same in the synchronous folder 214a again) in synchronization. At this time, the undeletion set screen 211e displays the selected thumbnail, having been surrounded by the broken line, in a state surrounded by a solid line. Further, the control portion 219 is so formed, if the image data corresponding to the image data set to undeletion is not present in the synchronous folder 254a of the portable telephone 205 when the home digital photo frame 201 is synchronized with the portable telephone 205, as to not undelete the image data set to undeletion.

On the other hand, the control portion 259 of the portable telephone 205 is so formed as to be capable of storing image data having been temporarily deleted from the synchronous folder 254a of the flash ROM 254 in the synchronous folder 254a again and making the display portion 251 display the same as the remote display image by receiving the same from the home digital photo frame 201 when the portable telephone 205 is synchronized with the home digital photo frame 201.

The remaining structure of the second embodiment is similar to that of the aforementioned first embodiment.

Exemplary synchronization processing of the home digital photo frame 201 and the portable telephone 205 according to the second embodiment of the present invention is now described with reference to FIGS. 12 and 15 to 18.

Before synchronization of the home digital photo frame 201 and the portable telephone 205, the file control list of the synchronous folder 214a (see FIG. 12) of the home digital photo frame 201 records files 1, 2, 3, 4, 5, 6A and 7A corresponding to image files respectively in a state arranged in a time-series manner, as shown in FIG. 15. Each of the files 1, 2, 3, 4, 5, 6A and 7A of the file control list of the synchronous folder 214a records the presence or absence of undeletion setting and the presence or absence of protection setting, in addition to the file name, the date on which the corresponding image file has been created and whether or not the corresponding image file has been deleted. The image data corresponding to the file 1 is set to protection. The files 3 and 4 correspond to image data having been deleted in the home digital photo frame 1, while the corresponding image data are set to undeletion.

Before synchronization of the home digital photo frame 201 and the portable telephone 205, the file control list of the synchronous folder 254a (see FIG. 12) of the portable telephone 205 records files 1, 2, 3, 4, 5, 6B and 7B corresponding to image files respectively in a state arranged in a time-series manner, as shown in FIG. 16. The files 1, 2, 3, 4 and 5 of the file control list of the synchronous folder 254a are identical to the files 1, 2, 3, 4 and 5 of the file control list of the synchronous folder 214a shown in FIG. 15 respectively, and the identical files correspond to identical image data. On the other hand, the files 6B and 7B of the file control list of the synchronous folder 254a are not identical to the files 6A and 7A of the file control list of the synchronous folder 214a shown in FIG. 15 respectively, but correspond to different image data. The image data corresponding to the file 5 is set to protection, while the files 1, 2 and 4 correspond to image data having been deleted in the portable telephone 205.

When either the home digital photo frame 201 or the portable telephone 205 receives a synchronization instruction, the image data corresponding to the files 6A and 7A of the synchronous folder 214a are recognized as the "self-retained image data" (image data not stored in the synchronous folder 254a but stored in the synchronous folder 214a to be displayed on the display portion 211 as the self-display image). Further, the image data corresponding to the files 6B and 7B of the synchronous folder 254a are recognized as the "remotely retained image data" (image data not stored in the synchronous folder 214a but stored in the synchronous folder 254a to be displayed on the display portion 251 as the remote display image). Then, the home digital photo frame 201 transmits the "self-retained image data" (image data corresponding to the files 6A and 7A) of the synchronous folder 214a to the portable telephone 205, while the portable telephone 205 transmits the "remotely retained image data" (image data corresponding to the files 6B and 7B) of the synchronous folder 254a to the home digital photo frame 201.

The image data corresponding to the file 1 set to protection in the home digital photo frame 201 is not deleted but continuously retained in the home digital photo frame 201 even if the same has been deleted from the synchronous folder 254*a* of the portable telephone 205. On the other hand, the image data corresponding to the file 2 having been deleted from the synchronous folder 254*a* of the portable telephone 205 is deleted from the synchronous folder 214*a* of the home digital photo frame 201.

The image data corresponding to the file 3 having been deleted from the synchronous folder 214*a* of the home digital photo frame 201 but set to undeletion is undeleted and stored in the synchronous folder 214*a* of the flash ROM 214 again when the home digital photo frame 201 receives the image data corresponding to the file 3 in the synchronous folder 254*a* of the portable telephone 205. On the other hand, the image data corresponding to the file 4 having been deleted from the synchronous folder 214*a* of the home digital photo frame 201 but set to undeletion has been deleted also from the synchronous folder 254*a* of the portable telephone 205, and hence the same is not undeleted in the synchronous folder 214*a*.

Consequently, the home digital photo frame 201 and the portable telephone 205 are so synchronized with each other that the synchronous folders 214*a* and 254*a* thereof are also synchronized with each other.

Thus, in the file control lists of the synchronous folders 214*a* and 254*a* of the home digital photo frame 201 and the portable telephone 205, the files 6A and 7A (see FIG. 15) created on the earlier date become files 6 and 7 in the corresponding file control list after synchronization while the files 6B and 7B (see FIG. 16) created on the later date become files 8 and 9 in the corresponding file control list after synchronization, as shown in FIGS. 17 and 18. In the file control list of the home digital photo frame 201, the files 2 and 4 correspond to the deleted image data while the image data corresponding to the file 1 is kept in the state set to protection, as shown in FIG. 17. In the file control list of the portable telephone 205, the files 1, 2 and 4 correspond to the deleted image data while the image data corresponding to the file 5 is kept in the state set to protection, as shown in FIG. 18.

Control flows in the home digital photo frame 201 and the portable telephone 205 according to the second embodiment of the present invention in synchronization are now described with reference to FIGS. 12, 15, 16 and 19 to 21. According to the second embodiment, the home digital photo frame 201 performs synchronization processing with respect to the portable telephone 205.

As shown in FIG. 19, the control portion 219 (see FIG. 12) of the home digital photo frame 201 determines whether or not the synchronous folder 214*a* (see FIG. 12) of the flash ROM 214 has been updated by storing image data read from any of various media cards at a step S201. If determining that the synchronous folder 214*a* has been updated at the step S201, the control portion 219 advances to a step S203 so that the home digital photo frame 201 is synchronized with the portable telephone 205. If determining that the synchronous folder 214*a* has not been updated at the step S201, on the other hand, the control portion 219 determines whether or not the user has issued a synchronization instruction at a step S202. If determining that the user has issued the synchronization instruction at the step S202, the control portion 219 advances to the step S203. If determining that the user has not issued the synchronization instruction at the step S202, on the other hand, the control portion 219 returns to the step S201.

At the step S203, the control portion 219 transmits a "synchronization request signal" to the portable telephone 205. Then, the control portion 219 advances to a step S204.

On the other hand, the control portion 259 (see FIG. 12) of the portable telephone 205 determines whether or not the "synchronization request signal" has been received from the home digital photo frame 201 at a step S221. The control portion 259 repeats this determination until the same determines that the "synchronization request signal" has been received. If determining that the "synchronization request signal" has been received at the step S221, the control portion 259 recognizes the synchronous folder 254*a* (see FIG. 12) to be synchronized with the home digital photo frame 201 and transmits the file control list (see FIG. 16) of the synchronous folder 254*a* to the home digital photo frame 201 at a step S222. Then, the control portion 259 advances to a step S223.

At the step S204, the control portion 219 of the home digital photo frame 201 determines whether or not the file control list of the synchronous folder 254*a* has been received from the portable telephone 205. The control portion 219 repeats this determination until the same determines that the file control list of the synchronous folder 254*a* has been received. If determining that the file control list of the synchronous folder 254*a* has been received at the step S204, the control portion 219 advances to a step S205.

At the step S205, the control portion 219 compares the received file control list of the synchronous folder 254*a* with the file control list (see FIG. 15) of the synchronous folder 214*a* and determines whether or not there are the "remotely retained image data" not stored in the synchronous folder 214*a* but stored in the synchronous folder 254*a* and displayed on the display portion 251 (see FIG. 12) as the remote display image. In other words, the control portion 219 determines whether or not the home digital photo frame 201 requires synchronization with the portable telephone 205. If determining that the home digital photo frame 201 requires synchronization with the portable telephone 205 at the step S205, the control portion 219 transmits a "transmission request data list" including information of the recognized "remotely retained image data" (image data corresponding to the files 6B and 7B shown in FIG. 15) to the portable telephone 205 at a step S206. Then, the control portion 219 advances to a step S207. If determining that the digital photo frame 201 does not require synchronization with the portable telephone 205 at the step S205, on the other hand, the control portion 219 advances to a step S241 of a control flow of the synchronization processing shown in FIG. 20.

The control portion 259 of the portable telephone 205 determines whether or not the "transmission request data list" has been received from the home digital photo frame 201 at the step S223. If determining that the "transmission request data list" has been received at the step S223, the control portion 259 transmits the "remotely retained image data" (image data corresponding to the files 6B and 7B) corresponding to the "transmission request data list" and the number (two) of the transmitted "remotely retained image data" to the home digital photo frame 201 at a step S224. Then, the control portion 259 advances to a step S225. If determining that the "transmission request data list" has not been received at the step S223, on the other hand, the control portion 259 advances to a step S227 shown in FIG. 21.

At the step S207, the control portion 219 of the home digital photo frame 201 determines whether or not the "remotely retained image data" have been entirely correctly received from the portable telephone 205 on the basis of the "transmission request data list". At this time, the control portion 219 determines whether or not the number of the received "remotely retained image data" and the received number of the "remotely retained image data" coincide with each other. If determining that the "remotely retained image data" have been entirely correctly received at the step S207, the control portion 219 advances to the step S241 of the control flow of the synchronization processing shown in FIG. 20, and performs the synchronization processing in the home digital photo frame 201. If determining that the "remotely retained image data" have not yet been entirely correctly received at the step S207, on the other hand, the control portion 219 advances to a step S208, creates a retransmission request data list related to the unreceived "remotely retained image data" and transmits the same to the portable telephone 205. Then, the control portion 219 advances to a step S209.

At the step S225, the control portion 259 of the portable telephone 205 determines whether or not the retransmission request data list has been received from the home digital photo frame 201. If determining that the retransmission request data list has been received at the step S225, the control portion 259 advances to a step S226, and transmits the "remotely retained image data" corresponding to the retransmission request data list and the number of the transmitted "remotely retained image data" to the home digital photo frame 201. Then, the control portion 259 returns to the step S225. If determining that the retransmission request data list has not been received at the step S225, on the other hand, the control portion 259 advances to the step S227 shown in FIG. 21.

At the step S209, the control portion 219 of the home digital photo frame 201 determines whether or not the "remotely retained image data" have been entirely correctly received from the portable telephone 205 on the basis of the retransmission request data list. At this time, the control portion 219 determines whether or not the number of the received "remotely retained image data" and the received number of the "remotely retained image data" coincide with each other. If determining that the "remotely retained image data" have been entirely correctly received at the step S209, the control portion 219 advances to the step S241 of the control flow of the synchronization processing shown in FIG. 20, and performs the synchronization processing in the home digital photo frame 201. If determining that the "remotely retained image data" have not yet been entirely correctly received at the step S209, on the other hand, the control portion 219 returns to the step S208.

Figure 20:
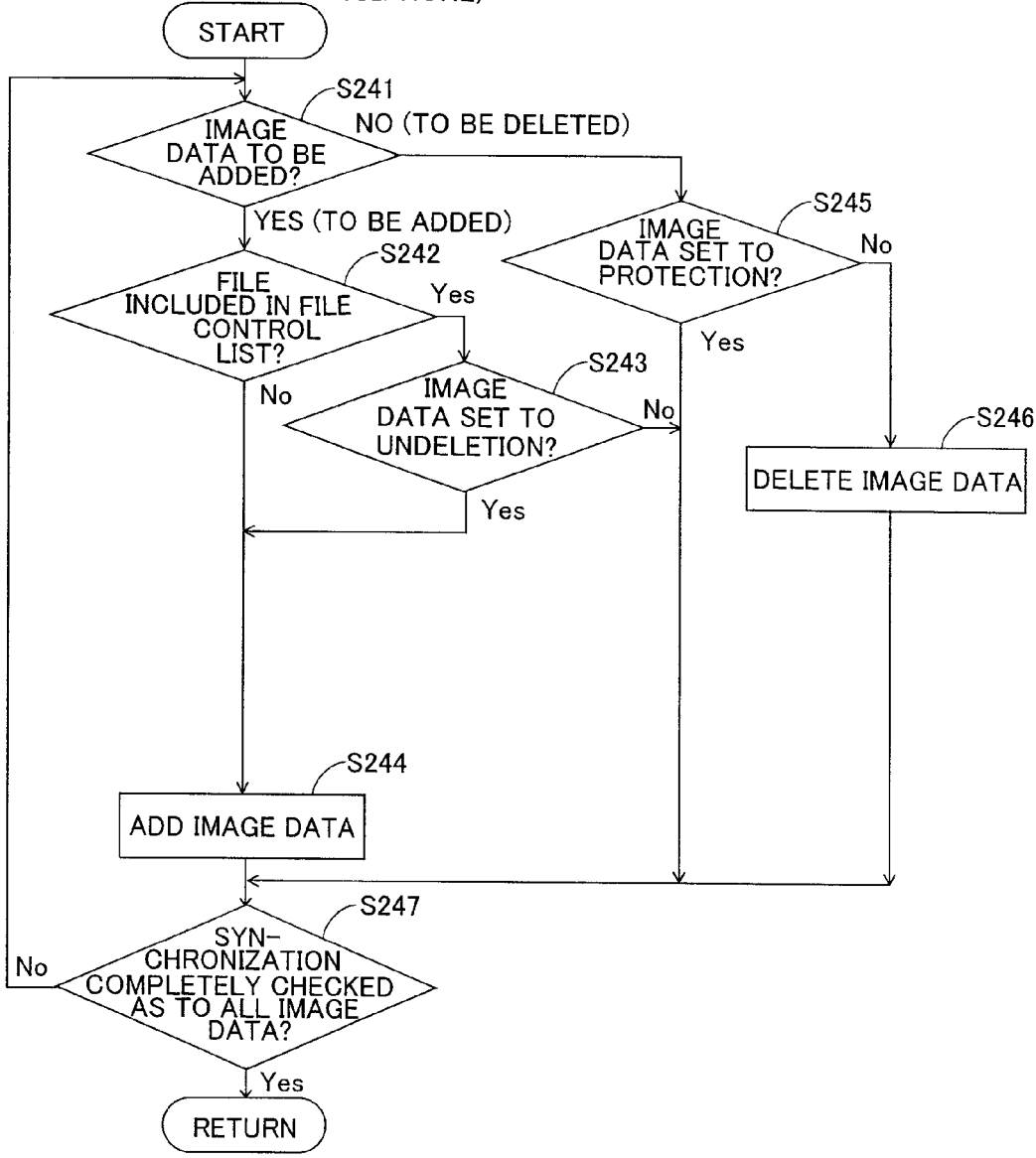
FIG. 20 is a flow chart showing a control flow of synchronization processing in each of the home digital photo frame and the portable telephone in the image display system according to the second embodiment of the present invention.

As the synchronization processing in the home digital photo frame 201 shown in FIG. 20, the control portion 219 of the home digital photo frame 201 determines whether the image data to be synchronized are the "remotely retained image data" received from the portable telephone 205 to be added to the synchronous folder 214a or those corresponding to the image data, having been deleted from the synchronous folder 254a of the portable telephone 205, to be deleted from the synchronous folder 214a. If determining that the image data are those (image data corresponding to the files 3, 6B and 7B shown in FIG. 16) to be added to the synchronous folder 214a at the step S241, the control portion 219 advances to a step S242. If determining that the image data are those (image data corresponding to the files 1 and 2 shown in FIG. 16) to be deleted from the synchronous folder 214a at the step S241, on the other hand, the control portion 219 advances to a step S245.

At the step S242, the control portion 219 determines whether or not a file related to the image data to be added to the synchronous folder 214a is included in the file control list of the synchronous folder 214a. If determining that the file related to the image data to be added to the synchronous folder 214a is included in the file control list of the synchronous folder 214a at the step S242, the control portion 219 advances to a step S243. According to the second embodiment, the image data of the file determined by the control portion 219 as included in the file control list of the synchronous folder 214a corresponds to the image data corresponding to the file 3 shown in FIG. 15.

At the step S243, the control portion 219 determines whether or not the image data to be added to the synchronous folder 214a is set to undeletion. If determining that the image data to be added to the synchronous folder 214a is set to undeletion at the step S243, the control portion 219 advances to a step S244 and stores the image data (image data corresponding to the file 3) having been deleted from the synchronous folder 214a in the synchronous folder 214a again. If determining that the file related to the image data to be added to the synchronous folder 214a is not included in the file control list of the synchronous folder 214a at the step S242, on the other hand, the control portion 219 determines that the image data (image data corresponding to the files 6B and 7B) to be added are new image data, advances to the step S244, and newly adds the image data (image data corresponding to the files 6B and 7B) to the synchronous folder 214a. Then, the control portion 219 advances to a step S247.

At the step S245, the control portion 219 determines whether or not the image data to be deleted from the synchronous folder 214a is set to protection. If determining that the image data to be deleted is set to protection at the step S245, the control portion 219 advances to the step S247 without deleting the image data (image data corresponding to the file 1) from the synchronous folder 214a. If determining that the image data to be deleted is not set to protection at the step S245, on the other hand, the control portion 219 advances to a step S246 and deletes the image data (image data corresponding to the file 2) from the synchronous folder 214a. Then, the control portion 219 advances to the step S247.

Finally at the step S247, the control portion 219 determines whether or not synchronization has been completely checked as to all image data in the synchronous folder 214a. If determining that synchronization has been completely checked as to all image data at the step S247, the control portion 219 advances to a step S210 shown in FIG. 21. The control portion 219 terminates the synchronization processing in the home digital photo frame 201 by determining that synchronization has been completely checked as to all image data at the step S247. If determining that synchronization has not yet been completely checked as to all image data at the step S247, on the other hand, the control portion 219 returns to the step S241.

Figure 21:
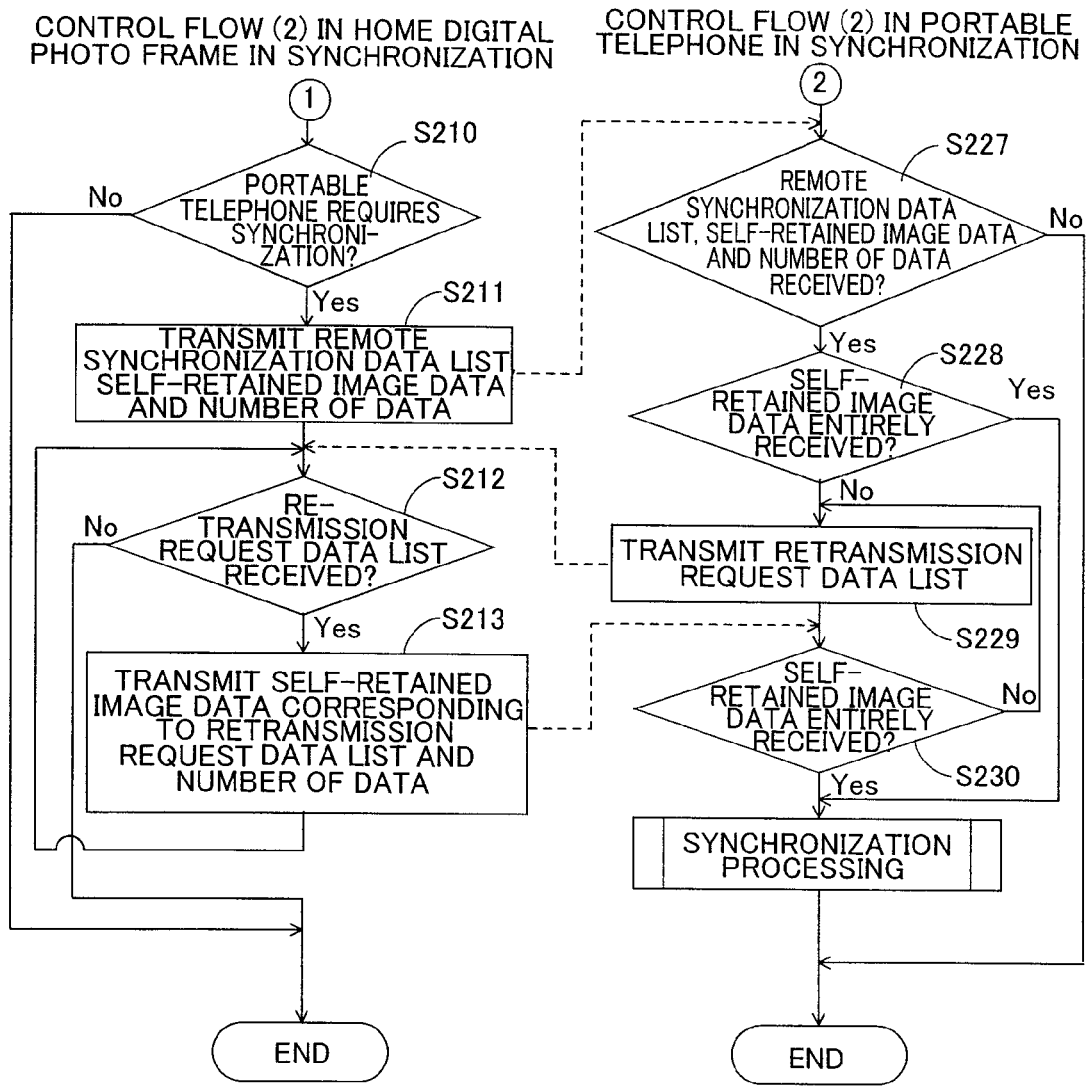
FIG. 21 is a flow chart showing control flows in the home digital photo frame and the portable telephone in synchronization in the image display system according to the second embodiment of the present invention.

At the step S210, the control portion 219 of the home digital photo frame 201 compares the received file control list (see FIG. 16) of the synchronous folder 254a with the file control list (see FIG. 15) of the synchronous folder 214a, as shown in FIG. 21. Then, the control portion 219 determines whether or not there is the "self-retained image data" not stored in the synchronous folder 254a but stored in the synchronous folder 214a and displayed on the display portion 211 (see FIG. 12) as the self-display image. In other words, the control portion 219 determines whether or not the portable telephone 205 requires synchronization with the home digital photo frame 201.

If determining that the portable telephone 205 requires synchronization with the home digital photo frame 201 at the step S210, the control portion 219 transmits a "remote synchronization data list" including information of the recognized "self-retained image data" (image data corresponding to the files 6A and 7A shown in FIG. 15) and information of image data having been deleted from the synchronous folder 214a, the "self-retained image data" corresponding to the "remote synchronization data list" and the number (two) of the transmitted "self-retained image data" to the portable telephone 205 at a step S211. Then, the control portion 219 advances to a step S212. If determining that the portable telephone 205 does not require synchronization at the step S210, on the other hand, the control portion 219 of the home digital photo frame 201 terminates the control.

At the step S227, the control portion 259 of the portable telephone 205 determines whether or not the "remote synchronization data list", the "self-retained image data" and the number of the "self-retained image data" have been received from the home digital photo frame 201. If determining that the "remote synchronization data list", the "self-retained image data" and the number of the "self-retained image data" have been received at the step S227, the control portion 259 advances to a step S228. If determining that the "remote synchronization data list", the "self-retained image data" and the number of the "self-retained image data" have not been received at the step S227, on the other hand, the portable telephone 205 does not require synchronization, and hence the control portion 259 of the portable telephone 205 terminates the control.

At the step S228, the control portion 259 determines whether or not the "self-retained image data" have been entirely correctly received from the home digital photo frame 201 on the basis of the "remote synchronization data list". At this time, the control portion 259 determines whether or not the number of the received "self-retained image data" and the received number of the "self-retained image data" coincide with each other. If determining that the "self-retained image data" have been entirely correctly received at the step S228, the control portion 259 advances to the step S241 of the control flow of the synchronization processing shown in FIG. 20, and performs the synchronization processing in the portable telephone 205. The synchronization processing in the portable telephone 205 is similar to the synchronization processing in the aforementioned home digital photo frame 201. The control portion 259 terminates the synchronization processing in the portable telephone 205 by determining that synchronization has been completely checked as to all image data at the step S247 shown in FIG. 20.

If determining that the "self-retained image data" have not yet been entirely correctly received at the step S228, on the other hand, the control portion 259 advances to a step S229, creates a retransmission request data list related to the unreceived "self-retained image data" and transmits the same to the home digital photo frame 201. Then, the control portion 259 advances to a step S230.

At the step S212, the control portion 219 of the home digital photo frame 201 determines whether or not the retransmission request data list has been received from the portable telephone 205. If determining that the retransmission request data list has been received at the step S212, the control portion 219 advances to a step S213, and transmits the "self-retained image data" corresponding to the retransmission request data list and the number of the transmitted "self-retained image data" to the portable telephone 205. Then, the control portion 219 returns to the step S212. If determining that the retransmission request data list has not been received at the step S212, on the other hand, the control portion 219 of the home digital photo frame 201 terminates the control.

At the step S230, the control portion 259 of the portable telephone 205 determines whether or not the "self-retained image data" have been entirely correctly received from the home digital photo frame 201 on the basis of the retransmission request data list. At this time, the control portion 259 determines whether or not the number of the received "self-retained image data" and the received number of the "self-retained image data" coincide with each other. If determining that the "self-retained image data" have been entirely correctly received at the step S230, the control portion 259 advances to the step S241 of the control flow of the synchronization processing shown in FIG. 20, and performs the synchronization processing in the portable telephone 205. The control portion 259 terminates the synchronization processing in the portable telephone 205 by determining that synchronization has been completely checked as to all image data at the step S247 shown in FIG. 20. If determining that the "self-retained image data" have not yet been entirely correctly received at the step S230, on the other hand, the control portion 259 returns to the step S229.

According to the second embodiment, as hereinabove described, the control portion 219 of the home digital photo frame 201 is so formed, if the same cannot receive the "remotely retained image data" from the portable telephone 205, as to create the retransmission request data list to post the unreceived "remotely retained image data" to the portable telephone 205 and as to re-receive the unreceived "remotely retained image data" from the portable telephone 205, whereby the control portion 219 can more reliably synchronize the self-display image and the remote display image with each other by re-receiving the unreceived "remotely retained image data" from the portable telephone 205 when the "remotely retained image data" have not been successfully received due to an unstable communication state between the home digital photo frame 201 and the portable telephone 205.

According to the second embodiment, as hereinabove described, the control portion 219 is so formed, if the same cannot receive the "remotely retained image data" from the portable telephone 205, as to create the retransmission request data list to post the unreceived "remotely retained image data" to the portable telephone 205, to re-receive only the unreceived "remotely retained image data" from the portable telephone 205 and as not to re-receive the received "remotely retained image data" from the portable telephone 205, whereby the control portion 219 can make the portable telephone 205 transmit only the unreceived "remotely retained image data" by transmitting the retransmission request data list to the portable telephone 205 while distinguishing the unreceived "remotely retained image data" and the already received "remotely retained image data" from each other. Thus, the quantity of image data transferred from the portable telephone 205 can be more reduced.

According to the second embodiment, as hereinabove described, the control portion 219 is so formed as to synchronize image data with each other upon folder updating (when the synchronous folder 214a of the flash ROM 214 stores image data read from any of various media cards) so that the same can synchronize the self-display image and the remote display image with each other every time the image data are updated, whereby the self-display image and the remote display image can be regularly kept synchronized with each other.

According to the second embodiment, as hereinabove described, the control portion 219 of the home digital photo frame 201 is so formed, even if the image data corresponding to the file 1 set to protection in the home digital photo frame 201 has been deleted from the synchronous folder 254a of the portable telephone 205, as to retain the image data without deleting the same in synchronization. Thus, the control portion 219 can be prevented from automatically deleting the image data of the file 1 set to protection as a result of the deletion of the image data in the portable telephone 205. The remaining effects of the second embodiment are similar to those of the aforementioned first embodiment.

Third Embodiment

An image display system 300 according to a third embodiment of the present invention is now described with reference to FIG. 22. In the image display system 300 according to the third embodiment, three image displays, i.e., the home digital photo frame 1 and the remote digital photo frame 2 according to the aforementioned first embodiment and the potable telephone 205 according to the aforementioned second embodiment synchronize image data with each other.

Figure 22:
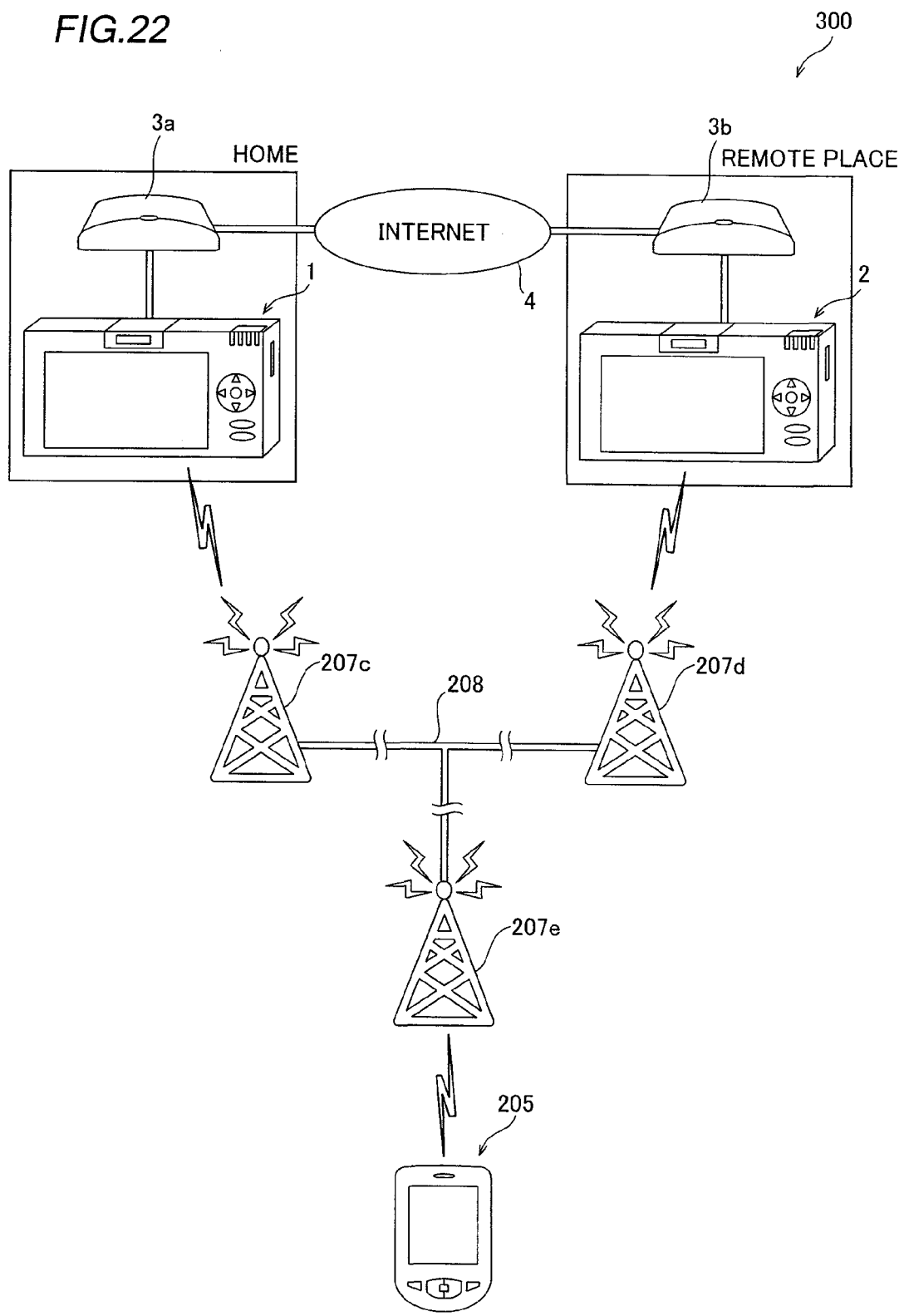
FIG. 22 is a schematic diagram showing the overall structure of an image display system according to a third embodiment of the present invention.

In the image display system 300 according to the third embodiment of the present invention, the home digital photo frame 1 arranged in the home of a user and the remote digital photo frame 2 arranged in a remote place different from the home are wire-connected to the Internet 4 through routers 3a and 3b respectively, as shown in FIG. 22. Different IP addresses are allocated to the home digital photo frame 1 and the remote digital photo frame 2 respectively. Thus, the home digital photo frame 1 and the remote digital photo frame 2 are so formed as to be capable of directly making wire communication with each other in peer relation by a peer-to-peer system through the Internet 4.

In the image display system 300, the home digital photo frame 1 is wireless-connected to a base station 207c. The remote digital photo frame 2 is wireless-connected to another base station 207d. The portable telephone 205 is wireless-connected to still another base station 207e. The base stations 207c, 207d and 207e are connected with each other through a telephone line network 208. Thus, the home digital photo frame 1, the remote digital photo frame 2 and the portable telephone 205 are wireless-connected with each other through the base stations 207c, 207d and 207e. Different mail addresses are allocated to the home digital photo frame 1, the remote digital photo frame 2 and the portable telephone 205 respectively. Thus, the home digital photo frame 1, the remote digital photo frame 2 and the portable telephone 205 are so formed as to be capable of directly making wireless communication with each other in peer relation by the peer-to-peer system.

The home digital photo frame 1 and the remote digital photo frame 2 are so formed as to be capable of setting the IP addresses. The home digital photo frame 1, the remote digital photo frame 2 and the portable telephone 205 are so formed as to be capable of setting the mail addresses.

Consequently, the home digital photo frame 1 is so formed as to be capable of synchronizing image data with the remote digital photo frame 2 by wire communication and wireless connection, and as to be capable of synchronizing image data with the portable telephone 205 by wireless connection. The remote digital photo frame 2 is so formed as to be capable of synchronizing image data with the home digital photo frame 1 by wire communication and wireless communication, and as to be capable of synchronizing image data with the portable telephone 205 by wireless connection. The portable telephone 205 is so formed as to be capable of synchronizing image data with the home digital photo frame 1 and the remote digital photo frame 2 by wireless communication.

The home digital photo frame 1 is so formed as to synchronize the image data with the remote digital photo frame 2 and the portable telephone 205 on the basis of a set order. More specifically, the home digital photo frame 1 is so formed, when setting the remote digital photo frame 2 in advance of the portable telephone 205, as to synchronize image data with the portable telephone 205 after synchronizing image data with the remote digital photo frame 2. Similarly, the remote digital photo frame 2 is so formed as to synchronize image data with the home digital photo frame 1 and the portable telephone 205 on the basis of a set order, while the portable telephone 205 is also so formed as to synchronize image data with the home digital photo frame 1 and the remote digital photo frame 2 on the basis of a set order.

The remaining structure, control flows in synchronization and effects of the third embodiment are similar to those of the aforementioned first and second embodiments.

Although the present invention has been described and illustrated in detail, it is clearly understood that the same is by way of illustration and example only and is not to be taken by way of limitation, the spirit and scope of the present invention being limited only by the terms of the appended claims.

Figure 23:
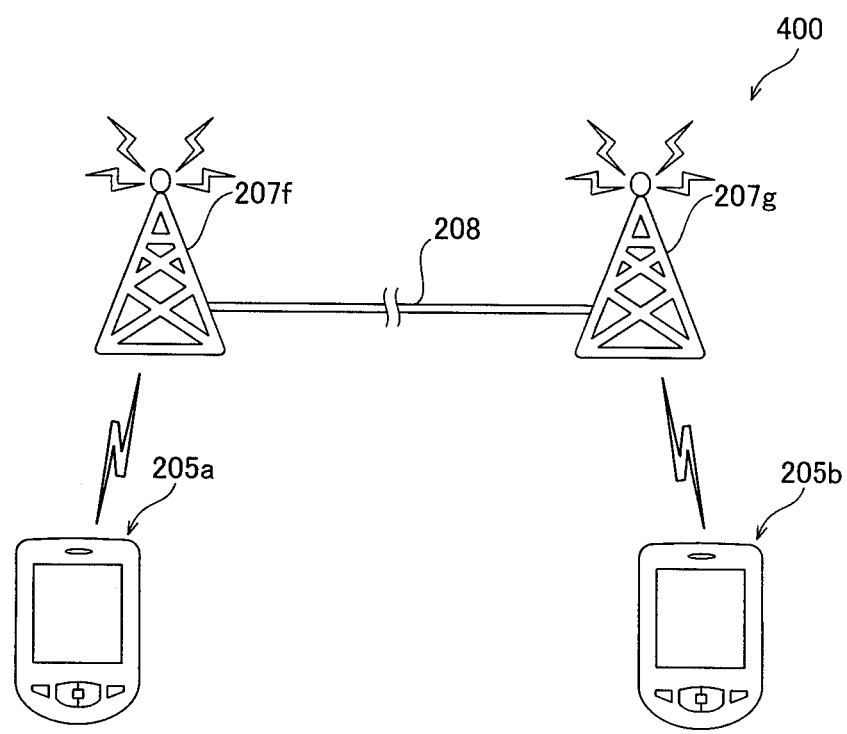
FIG. 23 is a schematic diagram showing the overall structure of an image display system according to a modification of the second embodiment of the present invention.

For example, while the image display system 100 according to the aforementioned first embodiment consists of the digital photo frames (the home digital photo frame 1 and the remote digital photo frame 2) and the image display system 200 according to the aforementioned second embodiment consists of the home digital photo frame 201 and the portable telephone 205, the present invention is not restricted to this. According to the present invention, the image display system may alternatively be constituted of two portable telephones. In a modification of the second embodiment shown in FIG. 23, for example, portable telephones 205a and 205b are wireless-connected to base stations 207f and 207g respectively. The base stations 207f and 207g are connected with each other through a telephone line network 208. Thus, the portable telephones 205a and 205b are wireless-connected with each other through the base stations 207f and 207g, to be capable of synchronizing image data with each other.

While the home digital photo frames 1 and 201 synchronize image data with the remote digital photo frame 2 and the portable telephone 205 respectively in the aforementioned first and second embodiments, the present invention is not restricted to this. According to the present invention, the remote digital photo frame and the portable telephone may alternatively synchronize image data with the home digital photo frames respectively. In this case, the image display system 100 is so formed that the remote digital photo frame 2 performs the control having been performed by the home digital photo frame 1 while the home digital photo frame 1 performs the control having been performed by the remote digital photo frame 2 in the aforementioned first embodiment. Further, the image display system 200 is so formed that the portable telephone 205 performs the control having been performed by the home digital photo frame 201 while the home digital photo frame 201 performs the control having been performed by the portable telephone 205.

While different IP addresses are allocated to the home digital photo frame 1 and the remote digital photo frame 2 respectively in the aforementioned first embodiment and different mail addresses are allocated to the home digital photo frame 201 and the portable telephone 205 respectively in the aforementioned second embodiment, the present invention is not restricted to this. According to the present invention, the remote apparatus to be synchronized may be specified through information other than the IP address or the mail address, so far as the remote apparatus to be synchronized can be specified through the information. If the digital photo frame (image display) has a function as a telephone, for example, the remote apparatus to be synchronized therewith may be specified through the telephone number of the remote apparatus to be synchronized therewith.

While each image display is so formed as to directly communicate with the apparatus to be synchronized with each other in peer relation by the peer-to-peer system by specifying the IP address of the apparatus to be synchronized therewith in each of the aforementioned first to third embodiments, the present invention is not restricted to this. According to the present invention, a communication system other than the peer-to-peer system may alternatively be applied.

While the home digital photo frame 1 and the remote digital photo frame 2 are so formed as to synchronize image data with each other at the prescribed time interval or in response to the synchronization instructions received from the users in the aforementioned first embodiment and the home digital photo frame 201 and the portable telephone 205 are so formed as to synchronize image data with each other upon folder updating or in response to the synchronization instructions received from the users in the aforementioned second embodiment, the present invention is not restricted to this. According to the present invention, the image displays may alternatively be so formed as to synchronize image data with each other at the prescribed time interval, upon folder updating and in response to the synchronization instructions received from the users. According to the present invention, the image displays may further alternatively be so formed as to synchronize image data with each other at the prescribed time interval, upon folder updating or in response to the synchronization instructions received from the users.

While the control portion 19 of the home digital photo frame 1 is so formed as to perform the synchronization processing after comparing the file control lists of the synchronous folders 24a and 14a with each other and recognizing the "self-retained image data" and the "remotely retained image data" in the aforementioned first embodiment, the present invention is not restricted to this. According to the present invention, the control portion of the home digital photo frame may alternatively be so formed as to transmit/receive all image data of the synchronous folder thereof and all image data of the synchronous folder of the remote digital photo frame without transmitting/receiving the file control lists. According to this structure, the frequency of communication between the home digital photo frame and the remote digital photo frame can be reduced.

While the home digital photo frame 1 and the remote digital photo frame 2 make wire communication with each other through the Internet line in the aforementioned first embodiment and the home digital photo frame 201 and the portable telephone 205 make wireless communication with each other through the 3G line in the aforementioned second embodiment, the present invention is not restricted to this. According to the present invention, the image display system may alternatively be so formed that a home digital photo frame and a portable telephone communicate with each other by wireless LAN connection, for example.

While the digital photo frame and the portable telephone are employed as the examples of the "image display" and the "remote image display" in the present invention respectively in each of the aforementioned first to third embodiments, the present invention is not restricted to this. The image display may alternatively be formed by another apparatus such as a smartphone, for example, so far as the apparatus includes a display portion and a communication portion.

What is claimed is:

1. An image display system comprising:
    a first image display including a first communication portion for transmitting/receiving image data, a first display portion for displaying image data as a first display image and a first control portion; and
    a second image display including a second communication portion for transmitting/receiving image data to/from said first communication portion of said first image display, a second display portion for displaying image data as a second display image and a second control portion, wherein
    said second control portion of said second image display is so formed as to transmit first image data not displayed on said first display portion of said first image display but displayed on said second display portion of said second image display to said first communication portion of said first image display while receiving second image data not displayed on said second display portion of said second image display but displayed on said first display portion of said first image display from said first communication portion of said first image display and displaying said second image data on said second display portion of said second image display when communicating with said first image display, and
    said first control portion of said first image display is so formed as to transmit said second image data to said second communication portion of said second image display while receiving said first image data from said second communication portion of said second image display and displaying said first image data on said first display portion of said first image display when communicating with said second image display,
    so that said first control portion and said second control portion can make said first display image and said second display image to be a same display image as each other.

2. The image display system according to claim 1, wherein said first image display is either an electronic photo frame or a portable telephone, and said second image display is also either an electronic photo frame or a portable telephone.

3. The image display system according to claim 1, wherein said first communication portion and said second communication portion are so formed as to directly communicate with each other.

4. The image display system according to claim 3, wherein said first communication portion and said second communication portion are so formed as to communicate with each other by a peer-to-peer system for directly communicating with each other in peer relation.

5. The image display system according to claim 1, wherein said first image display further includes a first storage portion storing image data of said first display image and first image data specification information for specifying said image data of said first display image in association with each other,
    said second image display further includes a second storage portion storing image data of said second display image and second image data specification information for specifying said image data of said second display image in association with each other,
    said first control portion is so formed as to transmit said first image data specification information for specifying said image data of said first display image to said second image display before making said first display image and said second display image to be the same display image as each other, and
    said second control portion is so formed as to recognize said first image data and said second image data to be synchronized with each other by receiving said first image data specification information from said first image display and comparing said first image data specification information and said second image data specification information with each other.

6. The image display system according to claim 5, wherein said second image data specification information includes a file name corresponding to said image data of said second display image and date information as to the date on which said image data of said second display image has been created, and said storage portion stores said file name and said date information in a list form.

7. The image display system according to claim 5, wherein said storage portion further stores a thumbnail associated with said image data of said second display image and said second image data specification information for selectably displaying said image data of said second display image on said second display portion.

8. The image display system according to claim 1, further comprising a storage portion storing image data of said second display image, and so formed as to be capable of previously setting said image data of said second display image to be the same as said remote image display, wherein said storage portion stores said image data of said second display image to be the same as said remote image display and said image data of said second display image not to be the same as said remote image display in a distinguished state.

9. The image display system according to claim 1, provided with a plurality of said communication portions, wherein said plurality of communication portions are so formed as to be capable of communicating with said remote image display through different communication systems respectively, so that a user selects any one of said plurality of communication portions.

\* \* \* \* \*